(12) United States Patent
Zhijian

(10) Patent No.: US 12,057,733 B2
(45) Date of Patent: Aug. 6, 2024

(54) SHEATH FOR CONVENIENT CHARGING

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

(21) Appl. No.: 17/903,078

(22) Filed: Sep. 6, 2022

(65) Prior Publication Data

US 2023/0040986 A1    Feb. 9, 2023

Related U.S. Application Data

(60) Division of application No. 17/151,756, filed on Jan. 19, 2021, now Pat. No. 11,735,949, which is a continuation-in-part of application No. 16/838,059, filed on Apr. 2, 2020, now Pat. No. 10,931,138, which is a continuation-in-part of application No. 16/388,994, filed on Apr. 19, 2019, now Pat. No. 10,931,137, which is a continuation of application No. 14/836,104, filed on Aug. 26, 2015, now Pat. No. 10,574,071, said application No. 17/151,756 is a continuation-in-part of application No. 16/388,994, filed on Apr. 19, 2019, now Pat. No. 10,931,137, which is a continuation of application No. 14/836,104, filed on Aug. 26, 2015, now Pat. No.
(Continued)

(30) Foreign Application Priority Data

Nov. 18, 2014 (CN) .......................... 201420692148.1
Aug. 20, 2015 (CN) .......................... 201520737260.7

(51) Int. Cl.
H02J 7/00    (2006.01)
H02J 7/34    (2006.01)

(52) U.S. Cl.
CPC ............ *H02J 7/342* (2020.01); *H02J 7/0042* (2013.01); *H02J 7/00* (2013.01)

(58) Field of Classification Search
CPC ............ H02J 7/342; H02J 7/0042; H02J 7/00
USPC ......................................... 320/103
See application file for complete search history.

(56) References Cited

U.S. PATENT DOCUMENTS 6,816,760 B1   11/2004  Namaky
6,870,089 B1    3/2005  Gray
(Continued)

FOREIGN PATENT DOCUMENTS

CN    206659368    11/2017
CN    208610074     3/2019
(Continued)

*Primary Examiner* — Nathaniel R Pelton
(74) *Attorney, Agent, or Firm* — Lippes Mathias LLP

(57) ABSTRACT

A sheath with a raised portion with a second open end, a bottom portion, a power storage space in a body, a magnet component configured to receive a mobile phone wireless charging holder, a USB cable having a female connector with an operative end, at least a portion of the bottom portion is in communication with the body, at least a portion of the sheath extends above the body, the operative end of the female connector is retained in the second open end to provide the female connector of the USB cable in a firm and flat position with the operative end of the female connector being operable and above the surface of the body, an exit on the body is adjacent to the sheath for the cable going through, which connects the female connector in the sheath to the power storage space and the wireless charger connects to the operative end.

3 Claims, 33 Drawing Sheets

Related U.S. Application Data 10,574,071, said application No. 17/151,756 is a continuation-in-part of application No. 16/738,208, filed on Jan. 9, 2020, now abandoned, which is a continuation of application No. 16/007,055, filed on Jun. 13, 2018, now abandoned, which is a continuation of application No. 14/930,719, filed on Nov. 3, 2015, now abandoned, said application No. 17/151,756 is a continuation-in-part of application No. 17/151,741, filed on Jan. 19, 2021, now Pat. No. 11,101,683, application No. 17/903,078 is a continuation of application No. 17/558,674, filed on Dec. 22, 2021, now Pat. No. 11,601,009.

(56) References Cited

U.S. PATENT DOCUMENTS

| | | | |
|---|---|---|---|
| 7,914,306 B1 | 3/2011 | Blackwell | |
| 8,593,108 B2 | 11/2013 | Ferber | |
| 9,144,281 B2 | 9/2015 | Cross | |
| 9,287,722 B2 | 3/2016 | Williams | |
| 9,419,456 B2 | 8/2016 | Pickens | |
| 9,722,439 B2 | 8/2017 | Williams | |
| 9,800,075 B2 | 10/2017 | McLean | |
| 9,865,153 B2 | 1/2018 | Zhijian | |
| 10,130,163 B2 | 11/2018 | Zhijian | |
| 10,547,036 B1 | 1/2020 | Ashley | |
| 10,992,075 B2 | 4/2021 | Chan | |
| 11,202,490 B1 | 12/2021 | Lloyd | |
| 2002/0198031 A1 | 12/2002 | Holmes | |
| 2004/0129749 A1 | 7/2004 | Hassett | |
| 2005/0116684 A1* | 6/2005 | Kim | H04M 1/6058 320/114 |
| 2005/0140331 A1 | 6/2005 | McQuade | |
| 2006/0273757 A1 | 2/2006 | Naguib | |
| 2007/0215663 A1 | 9/2007 | Chongson | |
| 2007/0297149 A1 | 12/2007 | Richardson | |
| 2008/0011799 A1 | 1/2008 | Chang | |
| 2008/0125164 A1 | 5/2008 | Singh | |
| 2008/0210728 A1 | 9/2008 | Bihn | |
| 2008/0283114 A1 | 11/2008 | Gray | |
| 2009/0006677 A1 | 1/2009 | Rofougaran | |
| 2009/0061926 A1 | 3/2009 | Lee | |
| 2009/0224722 A1 | 9/2009 | Causey | |
| 2009/0276089 A1 | 11/2009 | Bartholomew | |
| 2011/0110514 A1 | 5/2011 | Gustavsson | |
| 2012/0262116 A1 | 10/2012 | Ferber | |
| 2012/0262117 A1 | 10/2012 | Ferber | |
| 2012/0286718 A1 | 11/2012 | Richards | |
| 2012/0299528 A1 | 11/2012 | Scarmozzino | |
| 2013/0026726 A1 | 1/2013 | Thomas | |
| 2013/0162389 A1 | 6/2013 | Crucs | |
| 2013/0214931 A1 | 8/2013 | Chia | |
| 2013/0249673 A1 | 9/2013 | Ferrari | |
| 2014/0002239 A1 | 1/2014 | Rayner | |
| 2014/0061273 A1 | 3/2014 | Bullivant et al. | |
| 2014/0171132 A1 | 6/2014 | Ziemianska et al. | |
| 2014/0327401 A1* | 11/2014 | Pickens | H02J 7/0042 320/127 |
| 2015/0247831 A1* | 9/2015 | Lewis | H04M 1/21 455/566 |
| 2015/0270728 A1* | 9/2015 | Williams | H02J 7/0044 320/111 |
| 2015/0296644 A1 | 10/2015 | Chin | |
| 2015/0318716 A1* | 11/2015 | Pickens | H02J 7/0042 320/110 |
| 2015/0326044 A1* | 11/2015 | Ashley | H02J 7/342 320/103 |
| 2015/0351263 A1* | 12/2015 | DeSanctis | H02J 4/00 307/42 |
| 2015/0359127 A1 | 12/2015 | Daoura | |
| 2015/0366333 A1 | 12/2015 | Zhijian | |
| 2016/0141904 A1 | 5/2016 | Zhijian | |
| 2017/0119121 A1 | 5/2017 | Munoz | |
| 2018/0152037 A1 | 5/2018 | Yu | |
| 2018/0198295 A1 | 7/2018 | Warney | |
| 2020/0000207 A1 | 1/2020 | Liu | |
| 2021/0169203 A1 | 6/2021 | Woolery | |

FOREIGN PATENT DOCUMENTS

| | | |
|---|---|---|
| CN | 211017673 | 7/2020 |
| CN | 201730189762.5 | 9/2021 |
| KR | 101390704 | 4/2014 |
| KR | 2014132850 A | 11/2014 |

\* cited by examiner

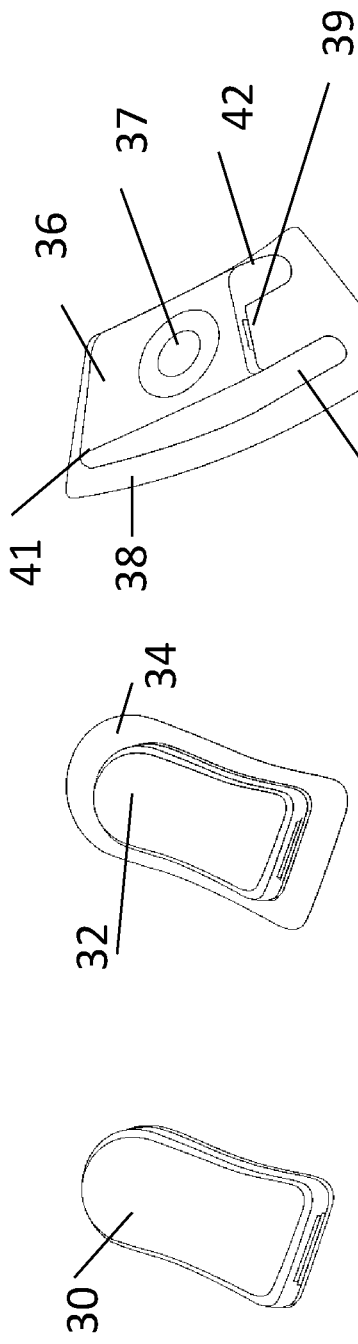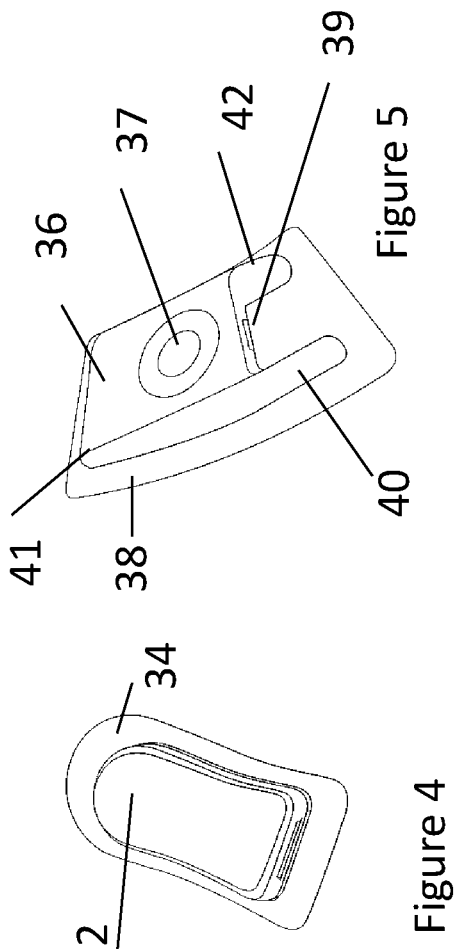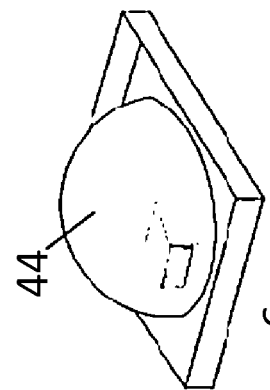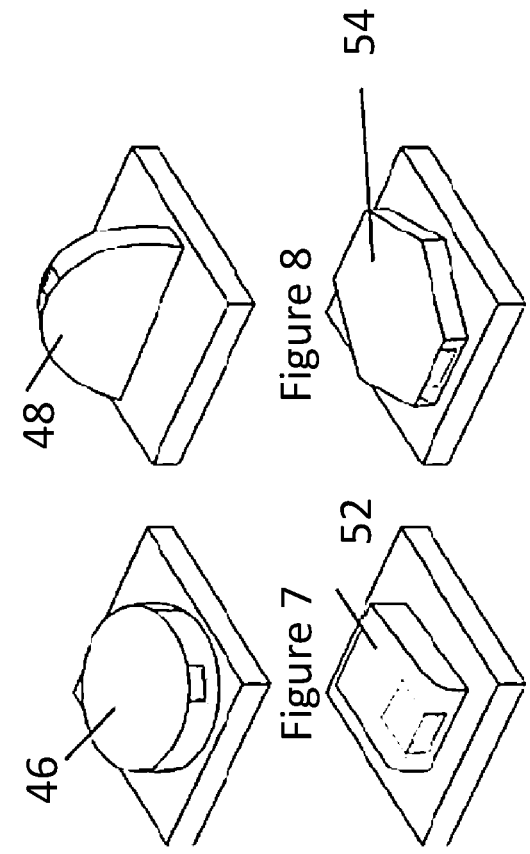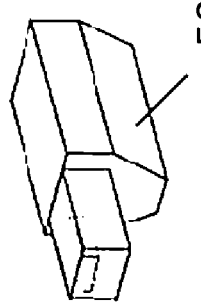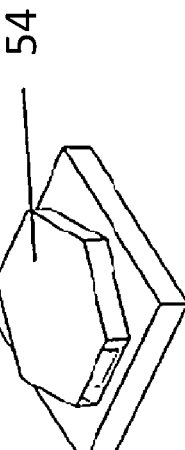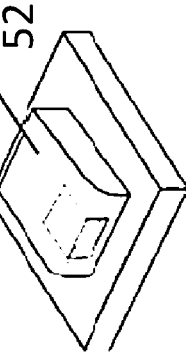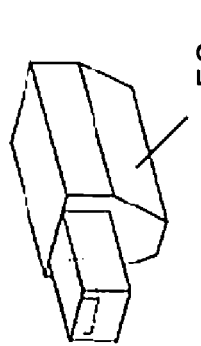

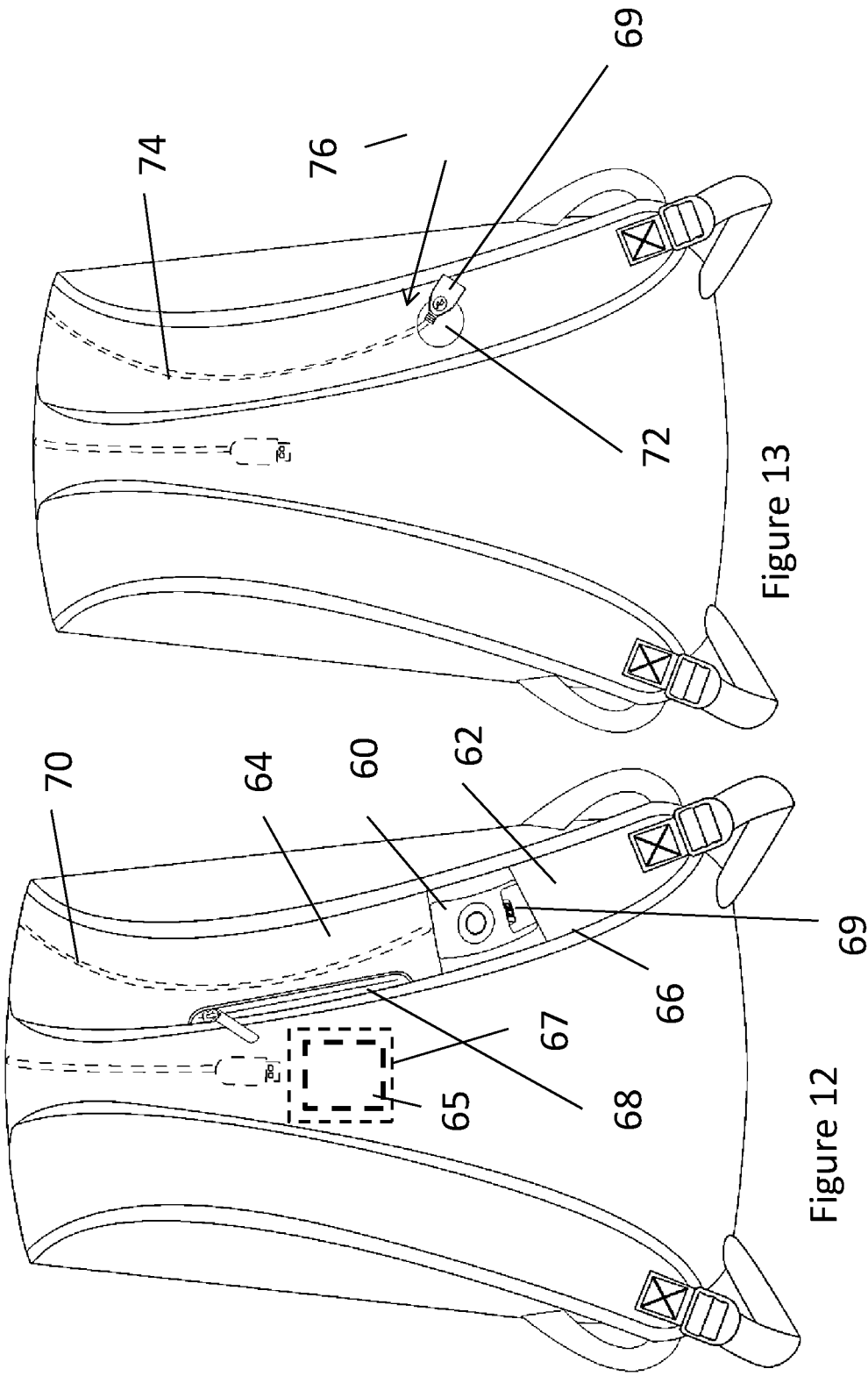

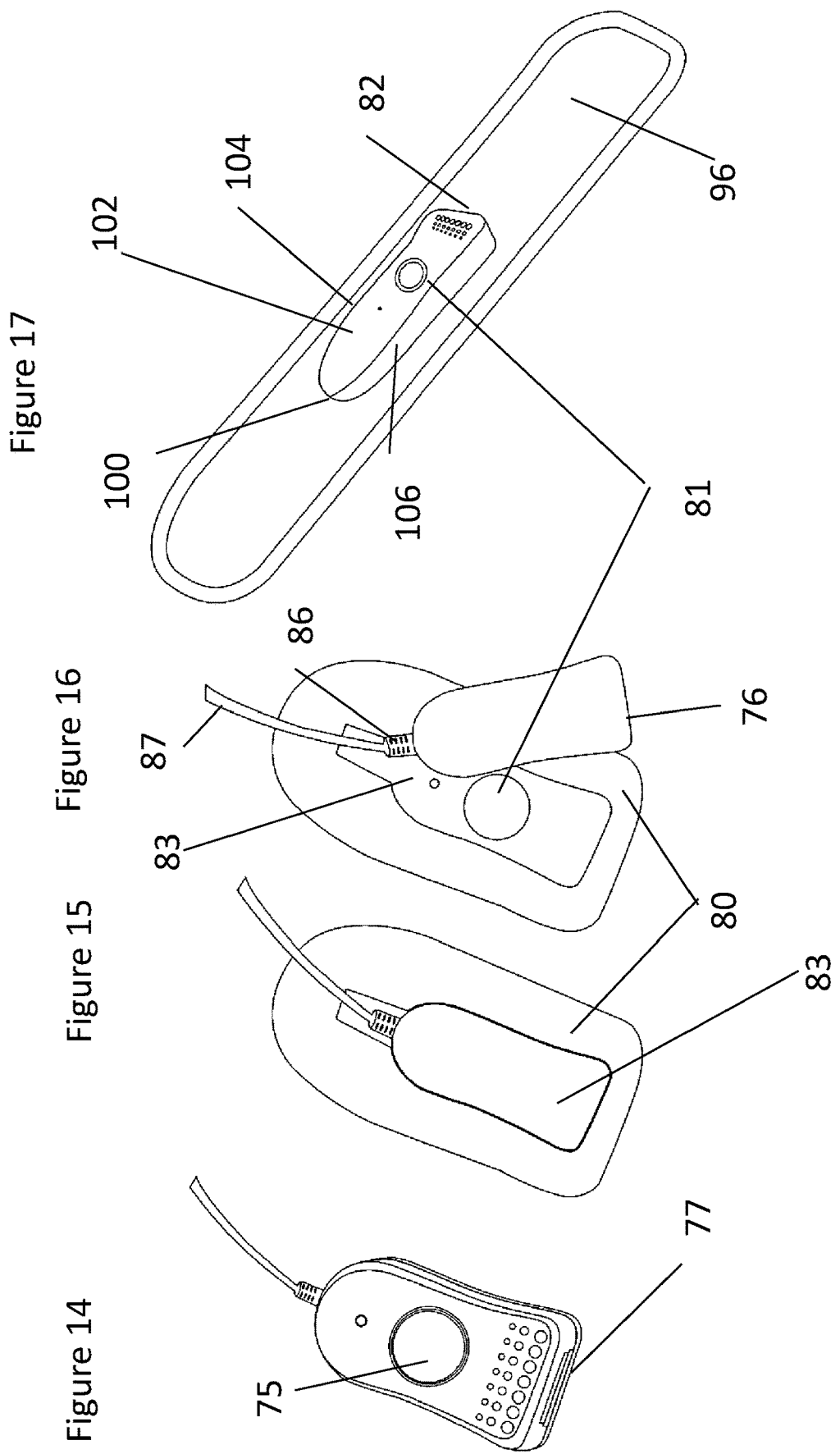

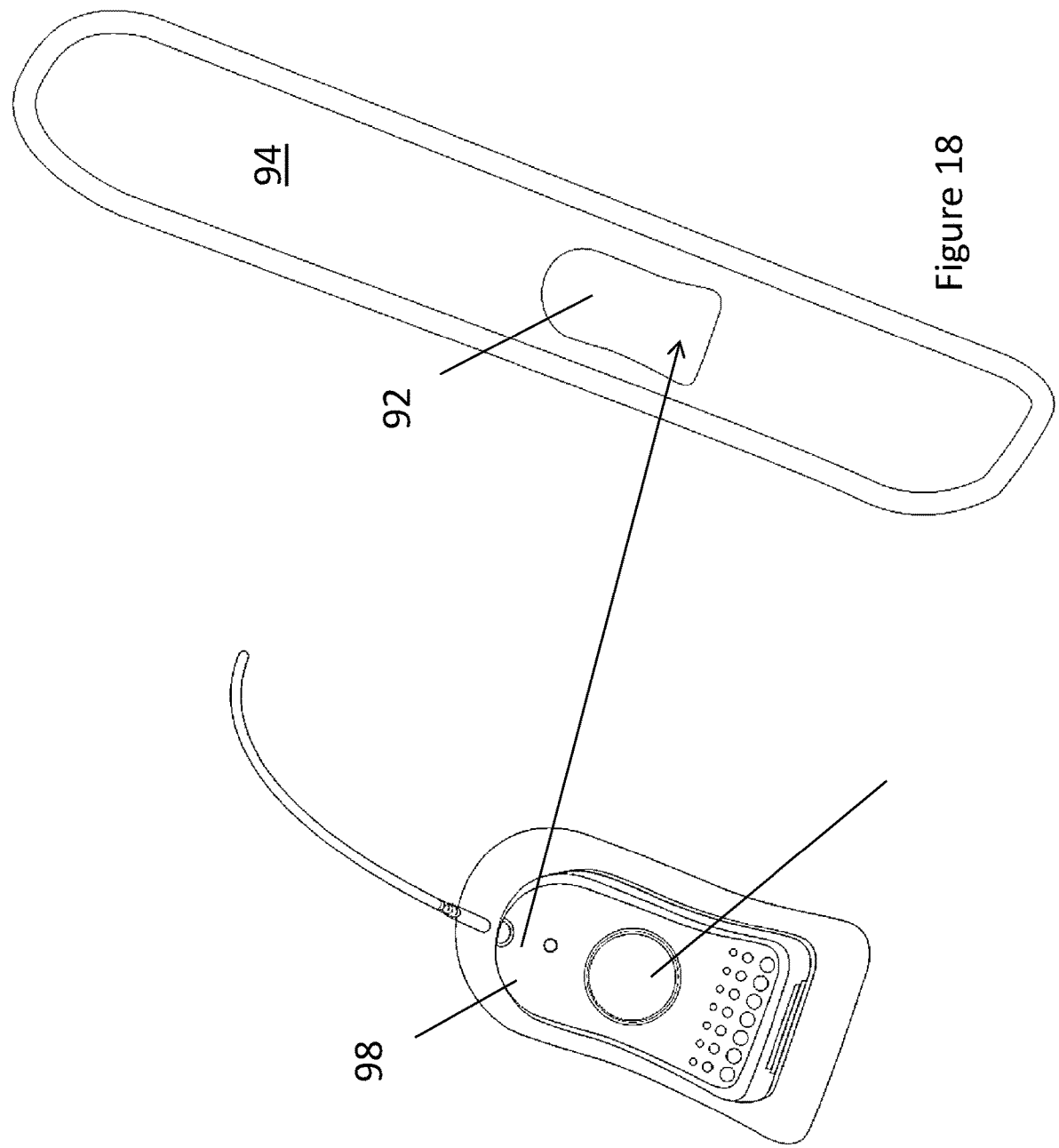

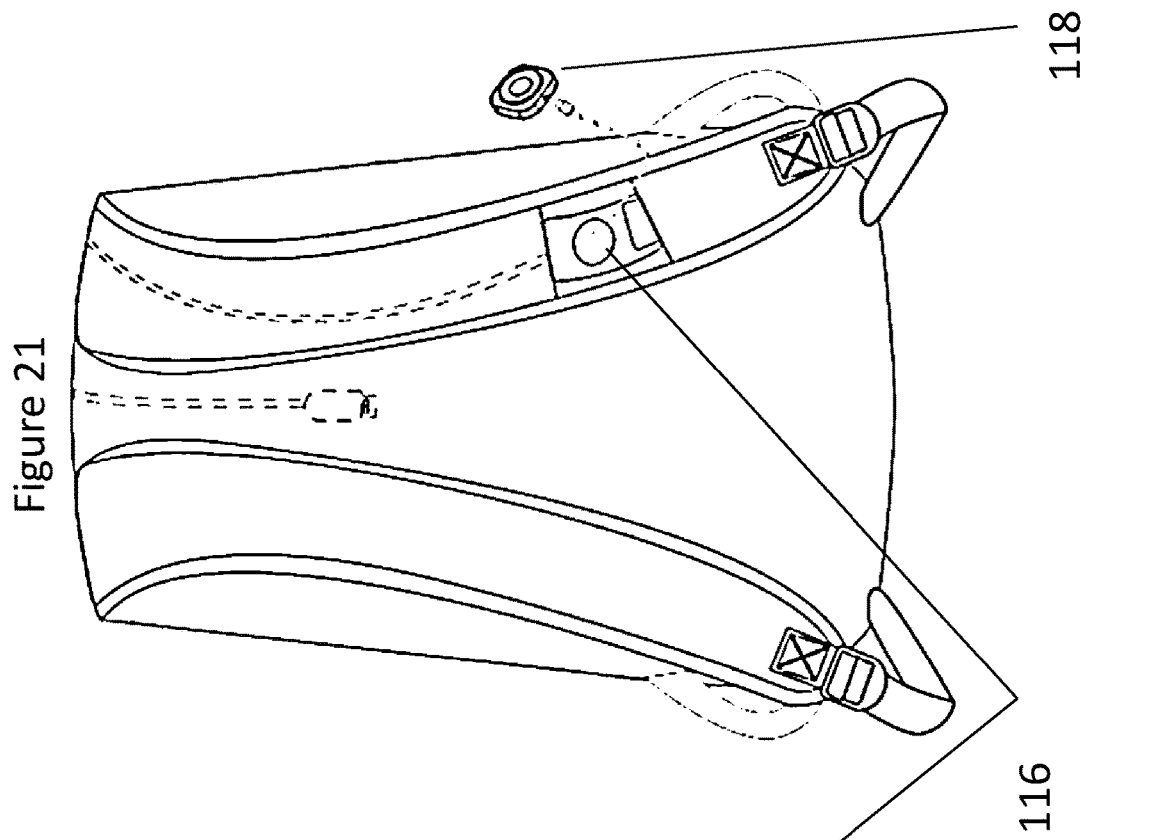
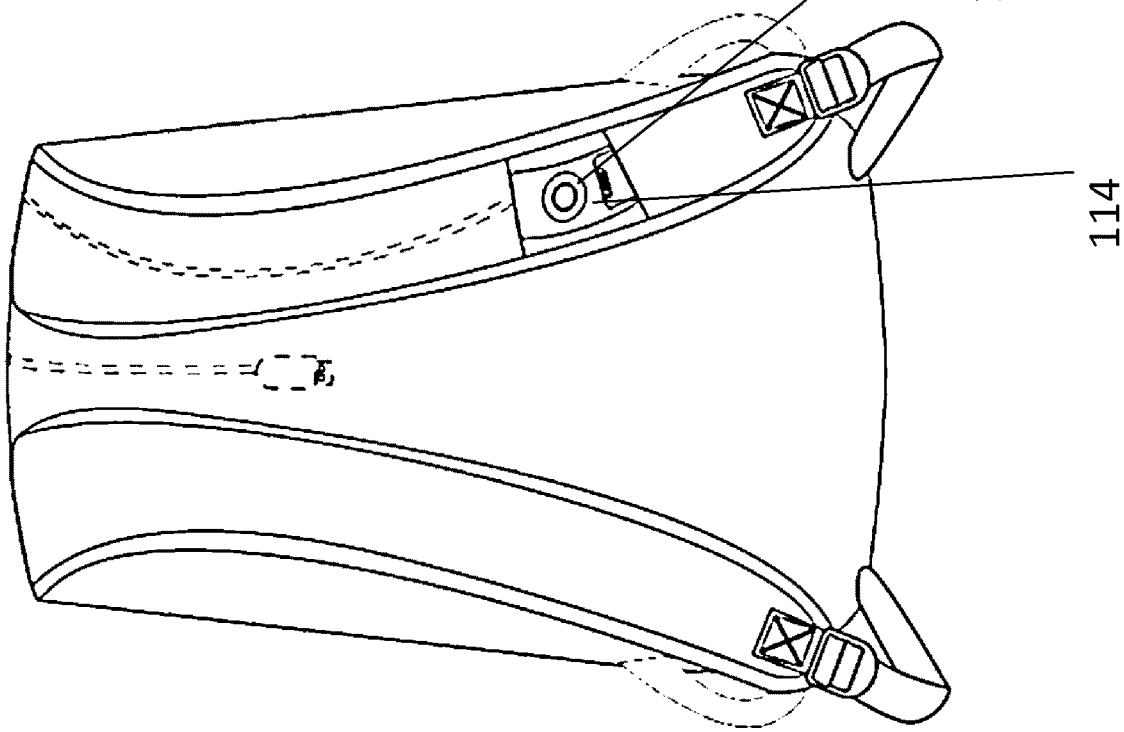

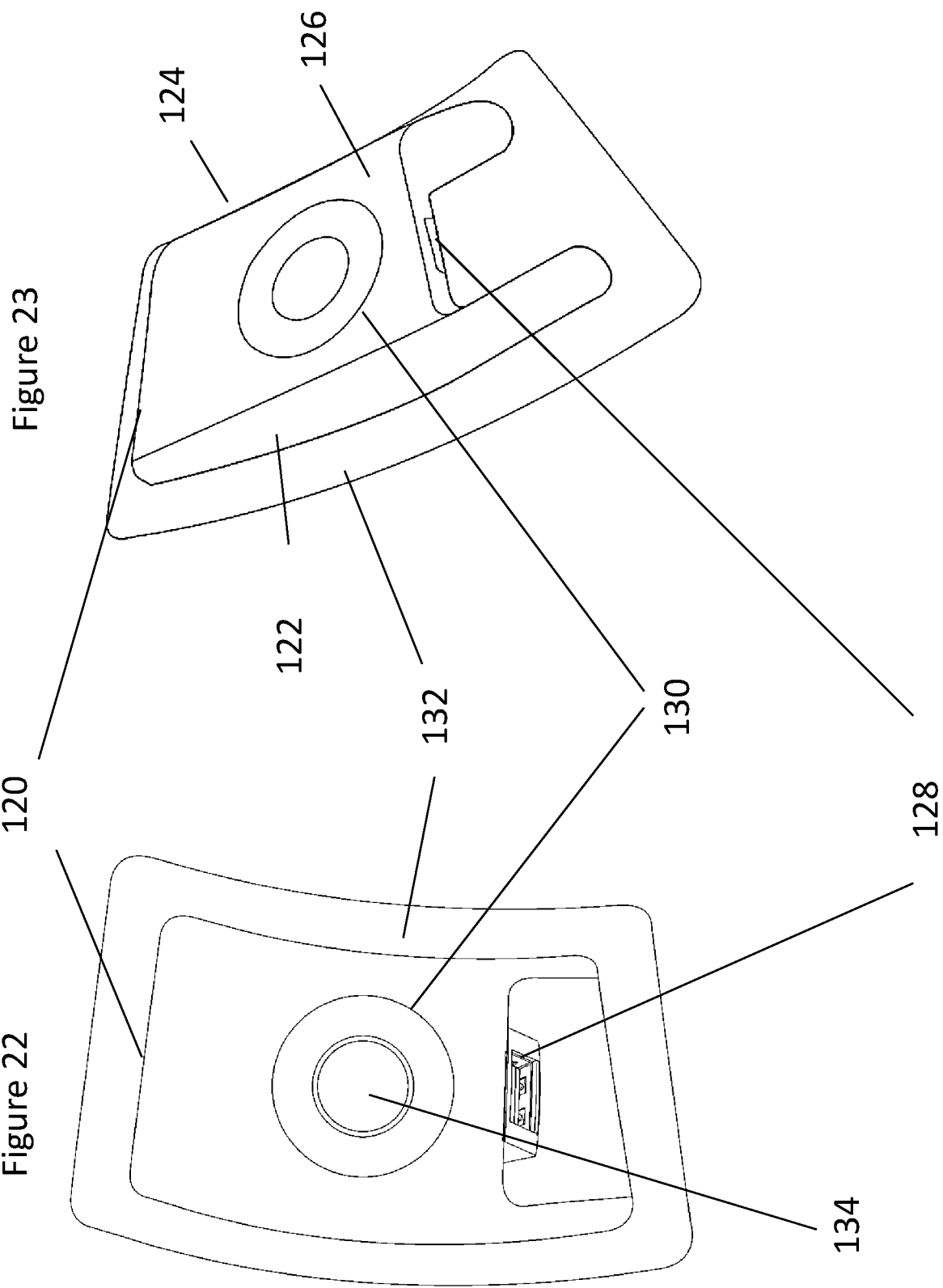

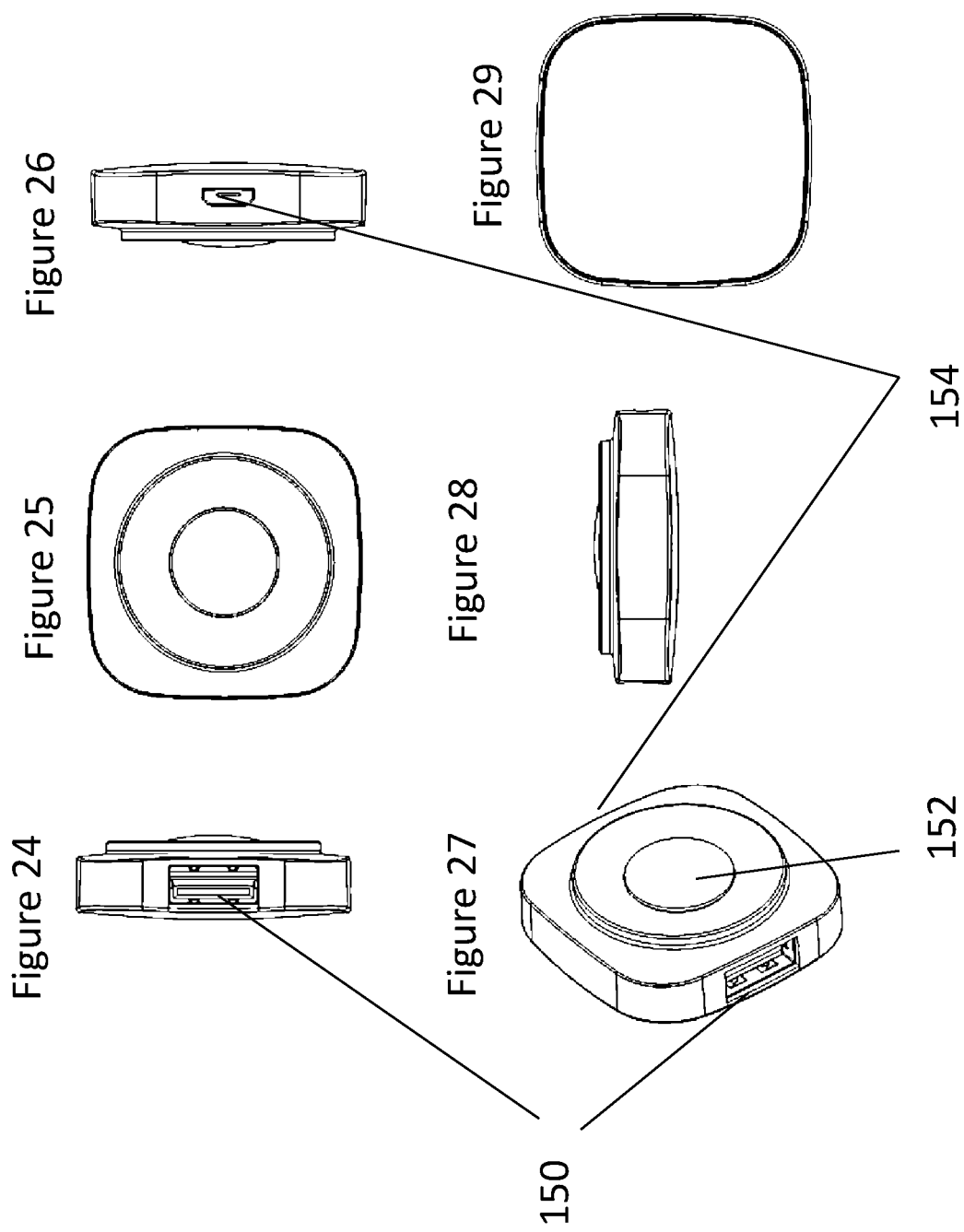

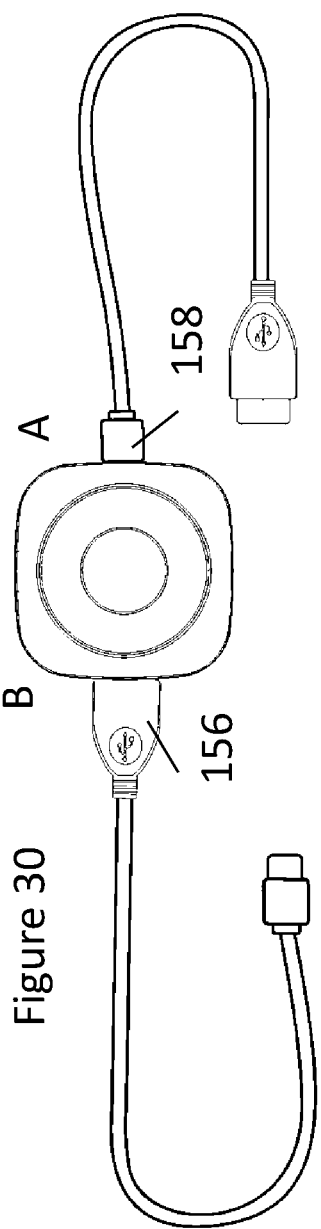
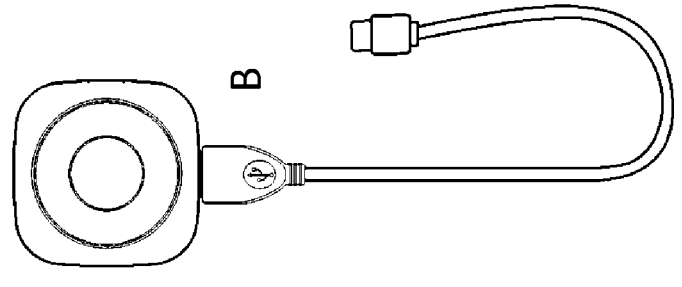
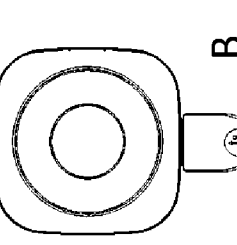
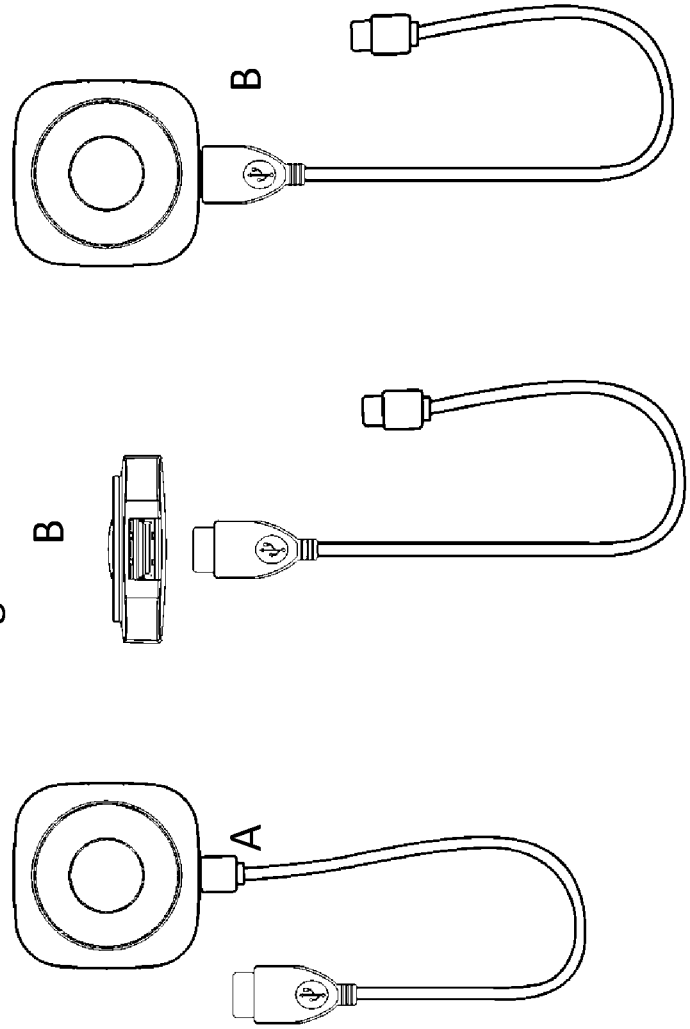
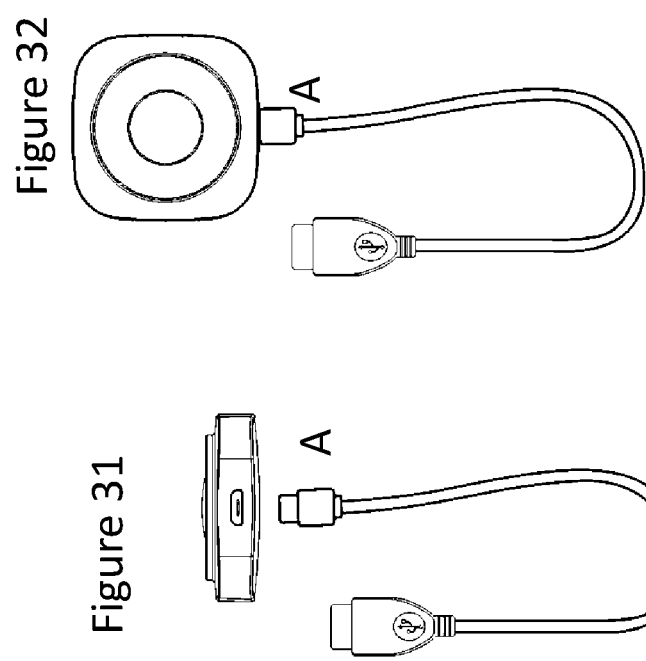

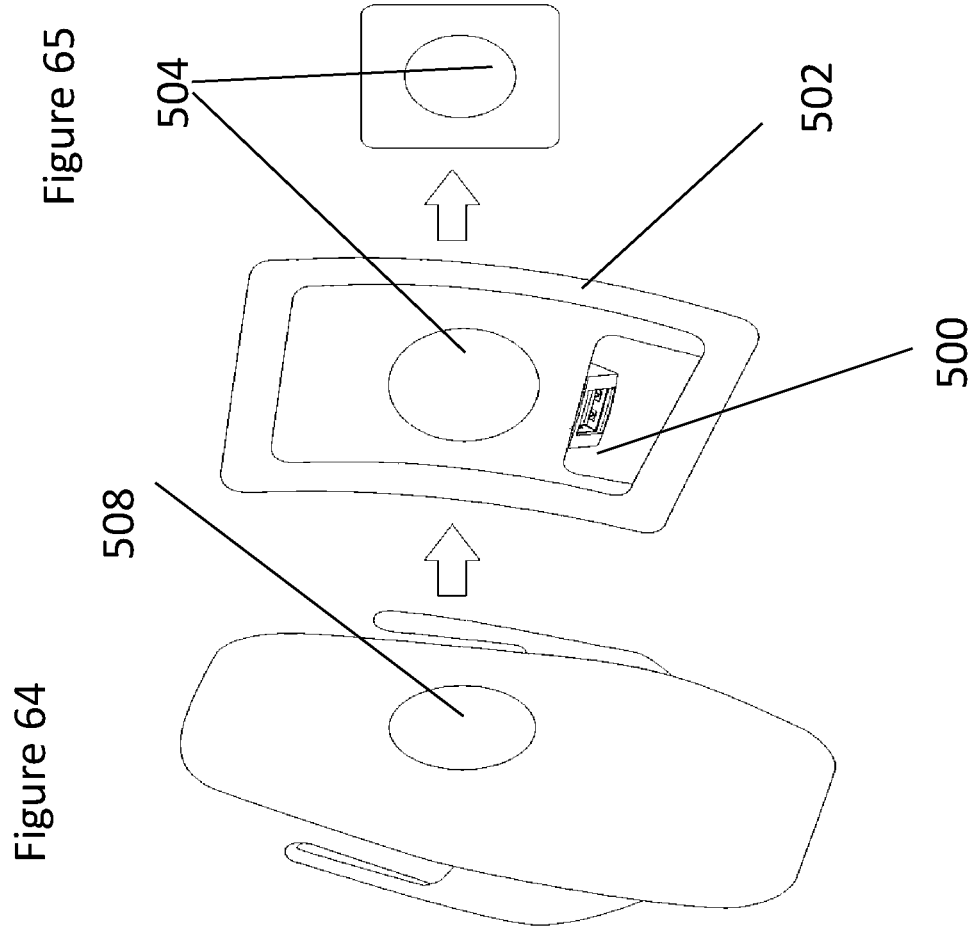
Figure 66
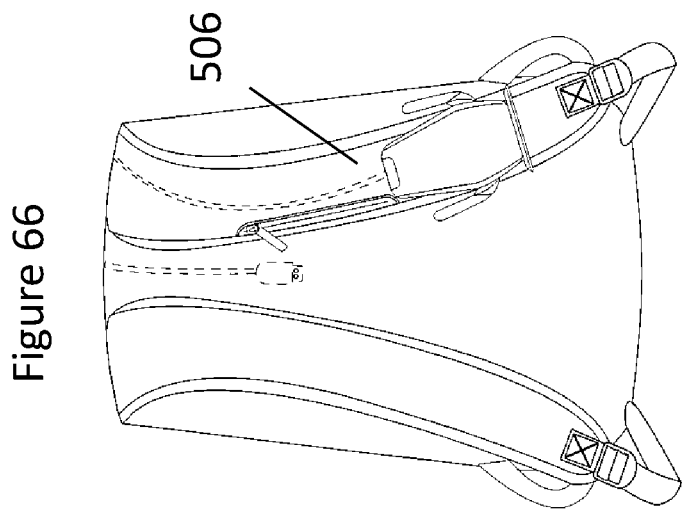
Figure 65
Figure 64

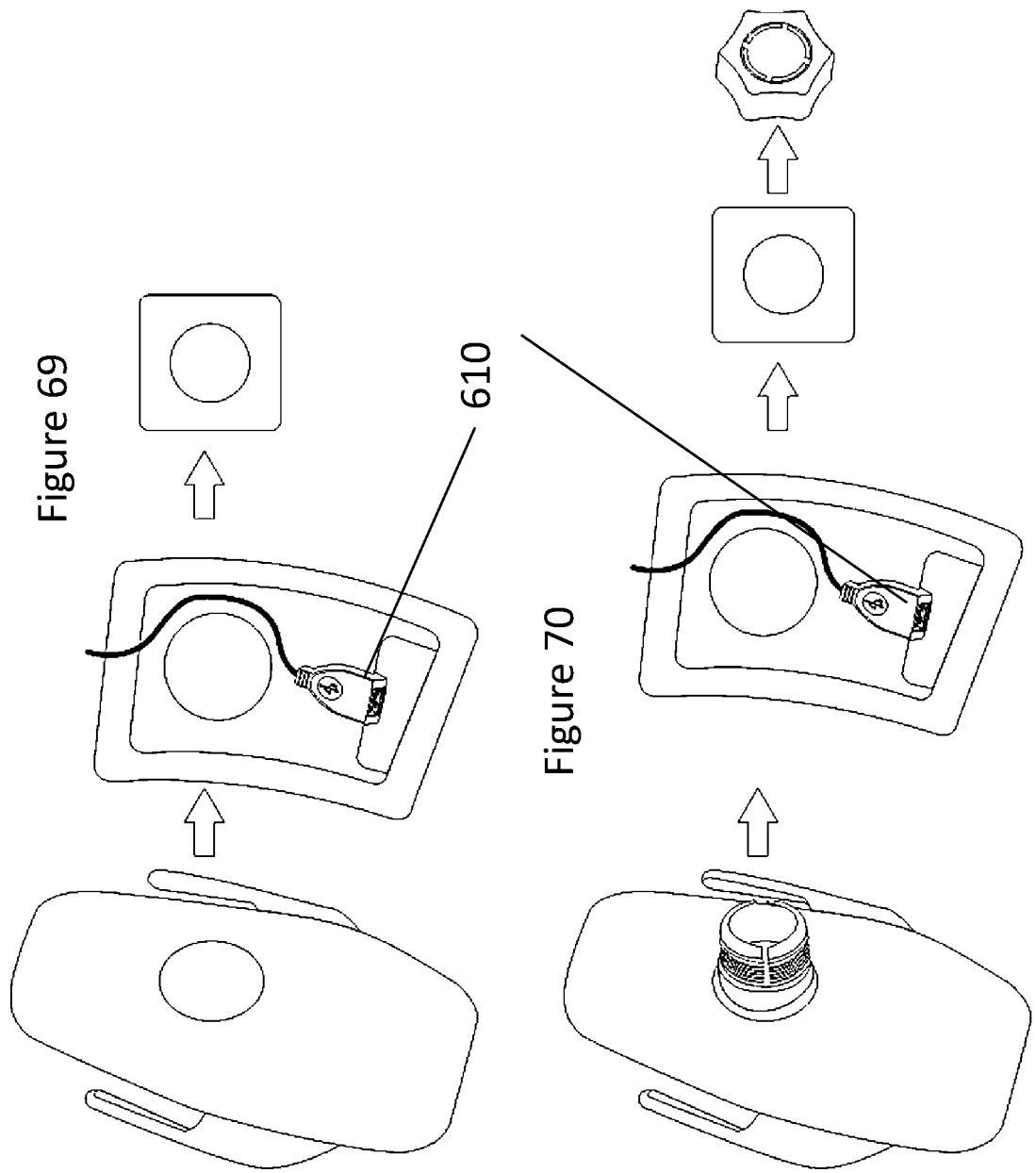

Back view front view

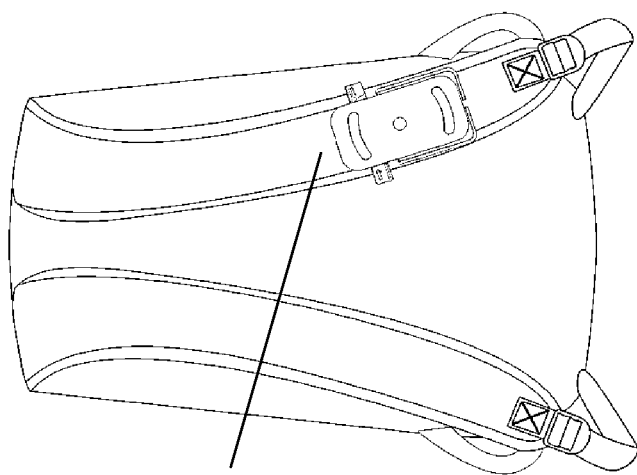
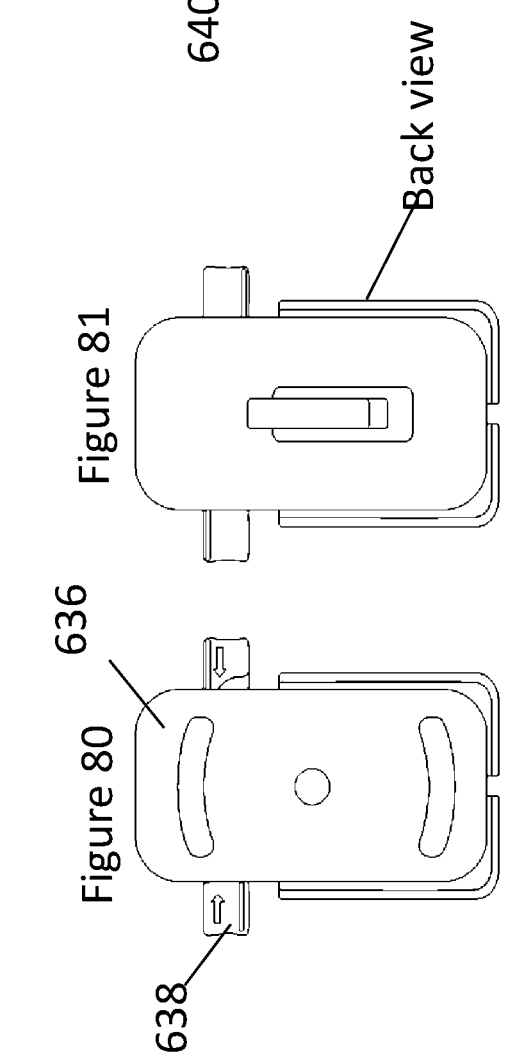
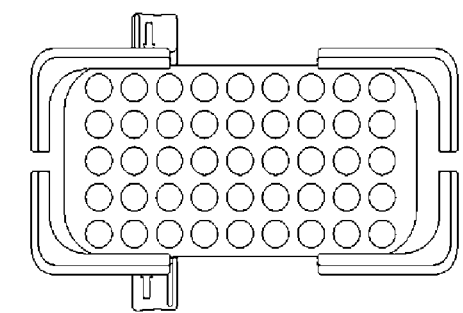
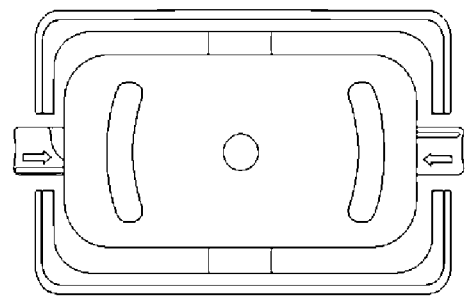
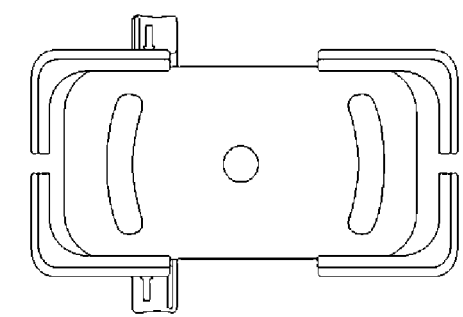

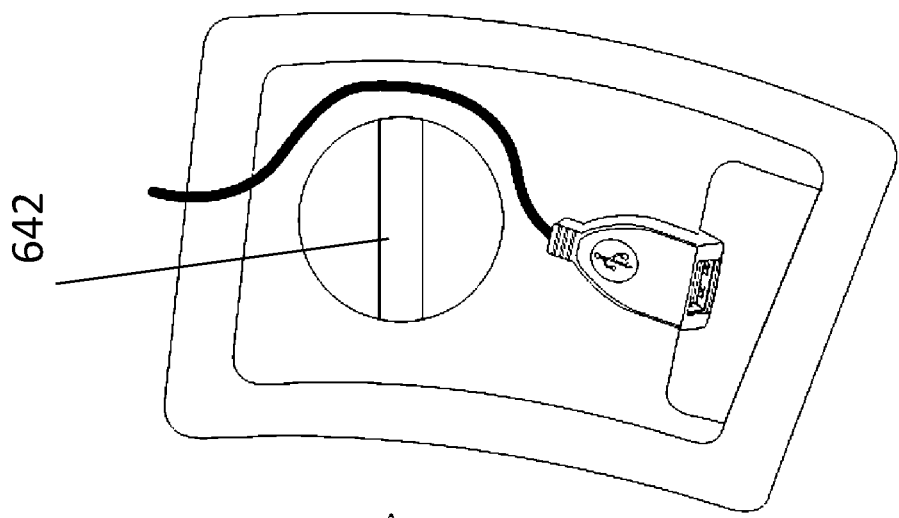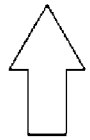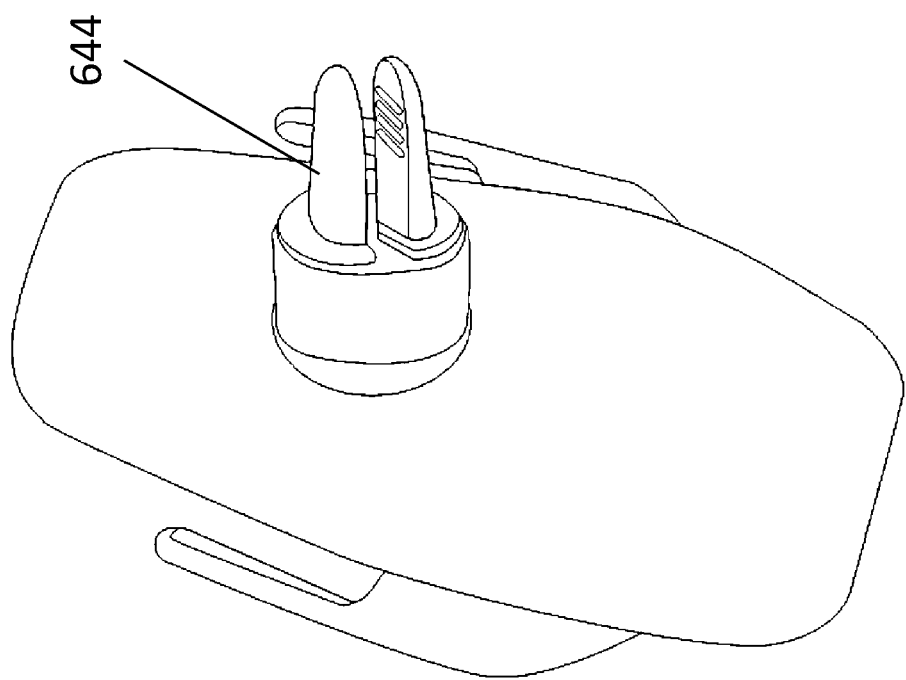

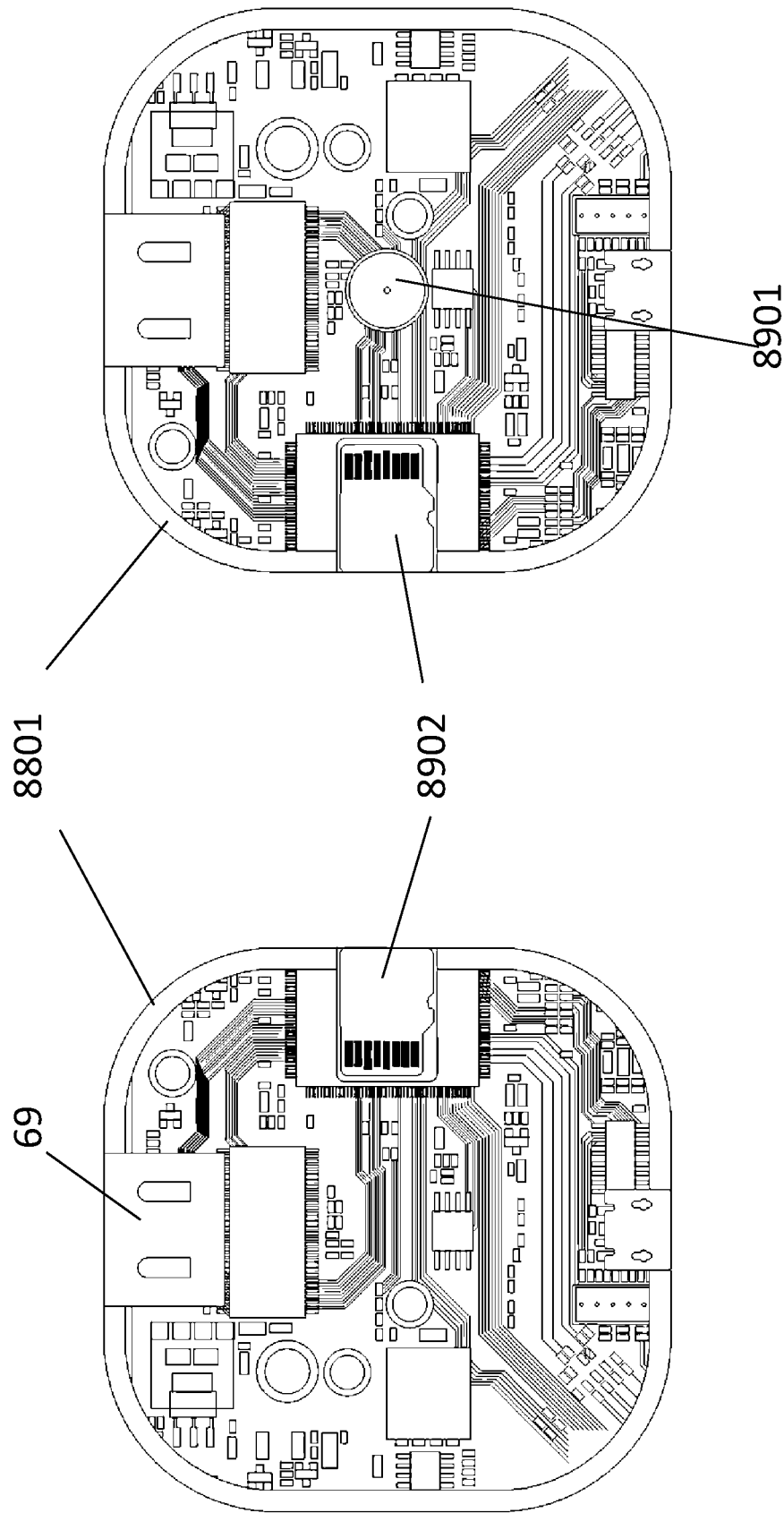

SHEATH FOR CONVENIENT CHARGING

PRIORITY CLAIM

This application is a divisional of patent application Ser. No. 17/151,756 filed Jan. 19, 2021. Application Ser. No. 17/151,756 claims priority to and is a continuation-in-part to application Ser. No. 16/838,059 entitled, "Sheath for USB Charger" which in turn claims priority to application Ser. No. 16/388,994 filed Apr. 19, 2019 as a continuation-in-part and is a continuation of application Ser. No. 14/836,104 filed Aug. 26, 2015, the entire contents of each of which are incorporated by reference herein in their entirety. Application Ser. No. 17/151,756 also claimed priority to and is a continuation in part to Ser. No. 16/388,994 entitled, "Sheath for USB Charger" which in turn claims priority to application to and is a continuation of application Ser. No. 14/836,104 filed Aug. 26, 2015 and claims priority to Chinese application number 201420692148.1 filed Nov. 18, 2014, the entire contents of each of which are incorporated by reference herein in their entirety. This application claims priority to application Ser. No. 16/738,208 filed Jan. 9, 2020 which in turn claims priority to Ser. No. 16/007,055 filed Jun. 13, 2018 and application Ser. No. 14/930,719 filed Nov. 3, 2015. This application claims priority to application Ser. No. 17/558,674 filed Dec. 22, 2021.

TECHNICAL FIELD

The present invention model relates to a sheath for a USB or wireless charger for convenient charging of personal devices such as smart phones, tablets or any device that requires recharging.

BACKGROUND OF THE INVENTION

With the constant development of our society, diverse portable digital devices are emerging in our lives, and we rely more and more on them, including tablet computers, cellphones, digital cameras, video cameras and the like. In addition to containing the stuff, people want more functionality from the bags and luggage. For example, charging the portable digital devices. Especially for tourists, field staff and those making long-term business trips, it is not easy to charge their digital devices when the battery is dying, causing a lot of inconvenience and trouble in their works and lives. The sheath according to the present invention allows for bags, luggage, clothing, activewear and anything wearable or carried to be equipped with a charging function, or a portable power source. It is no longer necessary to open the bag, luggage or clothing for charging, which is convenient.

SUMMARY OF THE INVENTION

The present invention intends to overcome the disadvantages stated above, and provides a sheath that may be incorporated into luggage, bags, gloves, activewear, jacket, socks, shoes, hats, glasses, goggles, belts or anything wearable or that can be carried for convenient charging, which enables the user to charge a device or product needing to be charged conveniently at any time or any place during traveling, without necessarily opening the bag, luggage, or clothing nor taking out the power source for charging. The term "body" refers to any suitable base that the sheath may be attached to for easy charging, including, without limitation a bag, luggage, clothing, activewear, shoes, hats, glasses, belt or anything wearable or that can be carried. The present invention also addresses wireless charging.

According to one aspect of the present invention, a sheath for convenient charging is provided, comprising: a raised portion and a surrounding bottom portion, wherein the raised portion has a first closed end, a second open end and the surrounding bottom portion surrounds at least a portion of the raised portion, wherein at least a portion of the raised portion extends above an outer surface of a body, wherein the body has an inner surface, an outer surface and a fourth opening between the inner surface and the outer surface; wherein the fourth opening is between the inner surface and the outer surface, and the raised portion receives a female connector having an operative end and a cord end and a cord in communication with the cord end; wherein the operative end of the female connector is retained in the second open end of the raised portion and the cord end of the female connector is retained in the first closed end of the raised portion to provide the female connector of the UBS cable in a flat position with the operative end of the female connector being operable and above the outer surface of the body, wherein the surrounding bottom portion of the sheath is attached to a portion of the body, wherein the cord is connecting between the female connector and a battery inside of the body, wherein the female connector has an actuation button.

According to another aspect of the present invention, a sheath for convenient charging, comprising: a raised portion and a surrounding bottom portion, wherein the raised portion of the sheath has a first open end, a second open end and a surrounding bottom portion surrounding at least a portion of the raised portion, and at least a portion extends above an outer surface of a body, wherein the raised portion receives a female connector having an output operative end, an input operative end and a detachable cord connecting between the input operative end and a battery inside of the body, wherein the output operative end of the female connector is retained in the second open end of the raised portion and the input operative end is retained in the first open end of the sheath to provide the female connector in a flat position with the operative ends being operable and above the outer surface of the body, wherein the surrounding bottom portion is attached to a portion of the body, wherein one of the sides of the female connector has an actuation button.

According to another aspect of the present invention, a sheath for convenient charging is provided having a raised portion with a fixed holder for mobile phone and a bottom portion, and at least a portion of the bottom portion communicating with a body, wherein the fixed holder for mobile phone is extends above a surface of a body, and adjustable to tightly hold different sizes, different shape of mobile phone, wherein the sheath has an opening, the rear side of raised portion receives a wireless charger, and the wireless charger stays inside of the raised portion, and can be removed from the opening of the sheath, wherein the raised portion and the fixed holder are positioned to make the wireless charger and mobile phone communicate with each other.

According to another aspect of the present invention, a sheath for convenient charging, comprising: a raised portion with a second open end, and a bottom portion, a power storage space in the body, and a magnet component, a USB cable having a female connector with an operative end, wherein the magnet component is configured to receive a mobile phone wireless charging holder which has a magnetic adjustable component, wherein at least a portion of the bottom portion is in communication with a body, wherein, at least a portion of the sheath extends above a surface of a body, wherein the operative end of the female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

According to another aspect of the present invention, a sheath for convenient charging, comprising: a raised portion with a second open end, a bottom portion, a power storage space in a body, and a universal adaptation nut, wherein the universal adaptation nut is configured to receive a mobile phone wireless charging holder, wherein at least a portion of the bottom portion is in communication with the body, wherein, at least a portion of the sheath extends above a surface of the body, wherein the operative end of a female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

According to another aspect of the present invention, a sheath for convenient charging, comprising: a raised portion with a fixed adjustable mobile phone holder and a bottom portion, wherein the fixed adjustable mobile phone holder is adjustable to tightly hold different sizes, different shape of mobile phone, wherein the raised portion contains wireless charging components that are fixed inside of the sheath, wherein the sheath is on a body with a cable laying channel going from the sheath to a power storage space in the body, wherein at least a portion of the bottom portion is in communication with the body, wherein the raised portion and the fixed holder are attached to make the wireless charger and mobile phone is communication with each other, providing a stable position for a mobile phone charging by a wireless charger on the outer surface of the body.

According to another aspect of the present invention, a sheath for convenient charging is provided, comprising: a raised portion with a fixed holder for mobile phone and wireless charger, wherein the fixed holder is adjustable to tightly hold the both mobile phone and wireless charger in different sizes, different shapes, wherein at least a portion of the sheath is firmly attached on a body, and at least a portion of the holder extends above an outer surface of the body, wherein the raised portion with a fixed holder is attached to provide the wireless charger and the mobile phone in communication with each other, providing a stable position for a mobile phone charging by a wireless charger on the outer surface of the body.

According to another aspect of the present invention, a sheath for convenient charging, comprising: a raised portion with a second open end, a bottom portion, a power storage space in a body, and a bracket for fixing, wherein the bracket for fixing is configured to receive a mobile phone wireless charging holder, wherein at least a portion of the bottom portion is in communication with the body, wherein, at least a portion of the sheath extends above a surface of the body, wherein the operative end of a female connector is retained in the second open end of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector.

During traveling, when the battery of the product to be charged is dying, it is only necessary to plug the charging interface of the product to be charged into the female end of the USB cable, or place the product on the wireless charger, then the charging starts, without necessarily opening the bag or luggage, nor taking out the power source for charging. And nowadays, many consumer have wireless chargers, which may be inconvenient to use when they are walking, running, climbing, etc, outside. The present invention offers a sheath which can help to hold the wireless charger, then consumers can "turn material resources to good account".

The sheath may be further equipped with a dust cap for dust proofing. The sheath may also have openings for ventilation, to prevent overheating of the device. The power cable outlet may be provided on the surface of the body, the female connector is operatively exposed outside the power cable outlet, and a dust cap may be attached on the side of the female connector. For the convenience of the configuration of the USB extension cable, the bag or luggage body may be provided with a cable laying channel from the power storage device placing space to the power cable outlet for the penetration of the USB extension cable. In order to prevent the loss of the bag or luggage, the female connector of the USB extension cable may be further equipped with a Bluetooth anti-lost alarm, which is used to connect to the Bluetooth device on the product to be charged. For real-time positioning or location of the bag or luggage for convenient charging provided by the utility model, the female connector of the USB extension cable may be further equipped with a GPS device for positioning (or locating).

Compared with the prior art, the present invention enjoys the following advantages (1) provides a body for convenient charging, which enables a user to charge a product needing to be charged conveniently at any time or any place during traveling, without necessarily opening the bag or luggage, nor taking out the power source for charging. (2) the charging interface is featured with waterproof and dust-proof functions, resulting in reliable performance; (3) the flat position of the female end of the USB provides a sturdy position for the external USB cable to connect to. In this way, a user may, with one hand attach an external USB cable; (4) the flat position of the wireless charger raised above the surface of the body provides a sturdy position for the device to be charged. The sheath may also be typically installed to face down towards the ground on the body. This also provides an additional level of waterproofing, as the open end is faced downward.

BRIEF DESCRIPTION OF THE DRAWINGS

The utility model is further described as follows with reference to drawings and embodiments:

FIGS. 1, 2, 3, 4, 5, 6, 7, 8, 9, 10, 11, 12, 13, 14, 15, 16, 17, 18, 19, 20, 21, 22, 23, 24, 25 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99 depict aspects of the present invention.

DETAILED DESCRIPTION OF THE EMBODIMENTS

The content of the utility model is further described in detail as follows with reference to the drawings for specification and specific embodiments.

Figure 1:
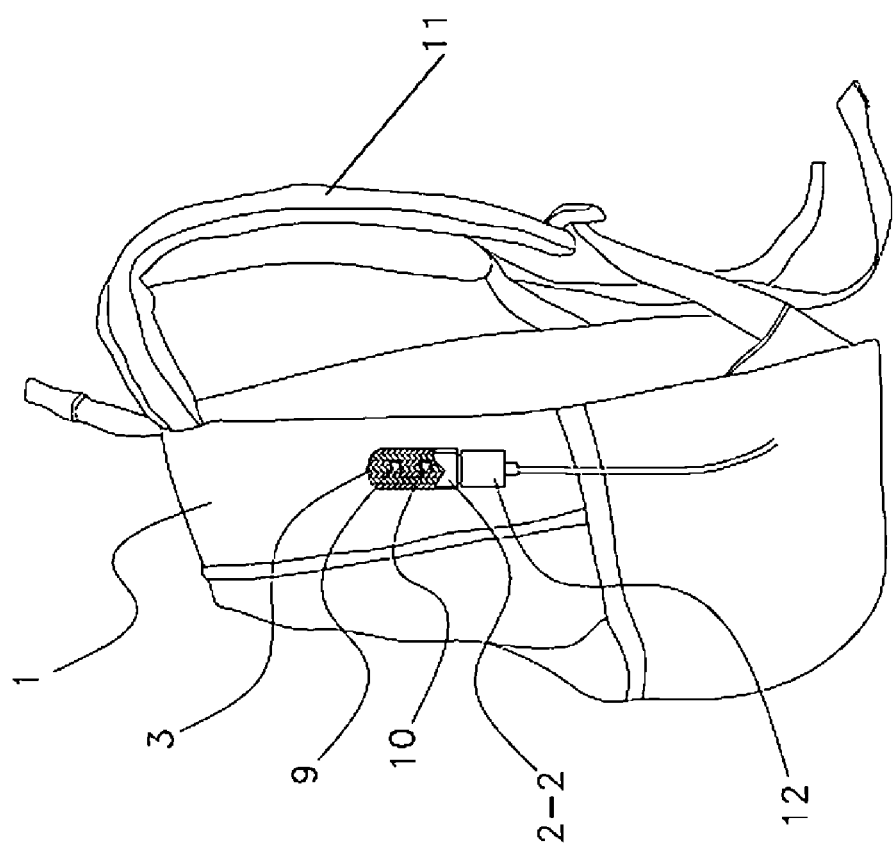
Figure 2:
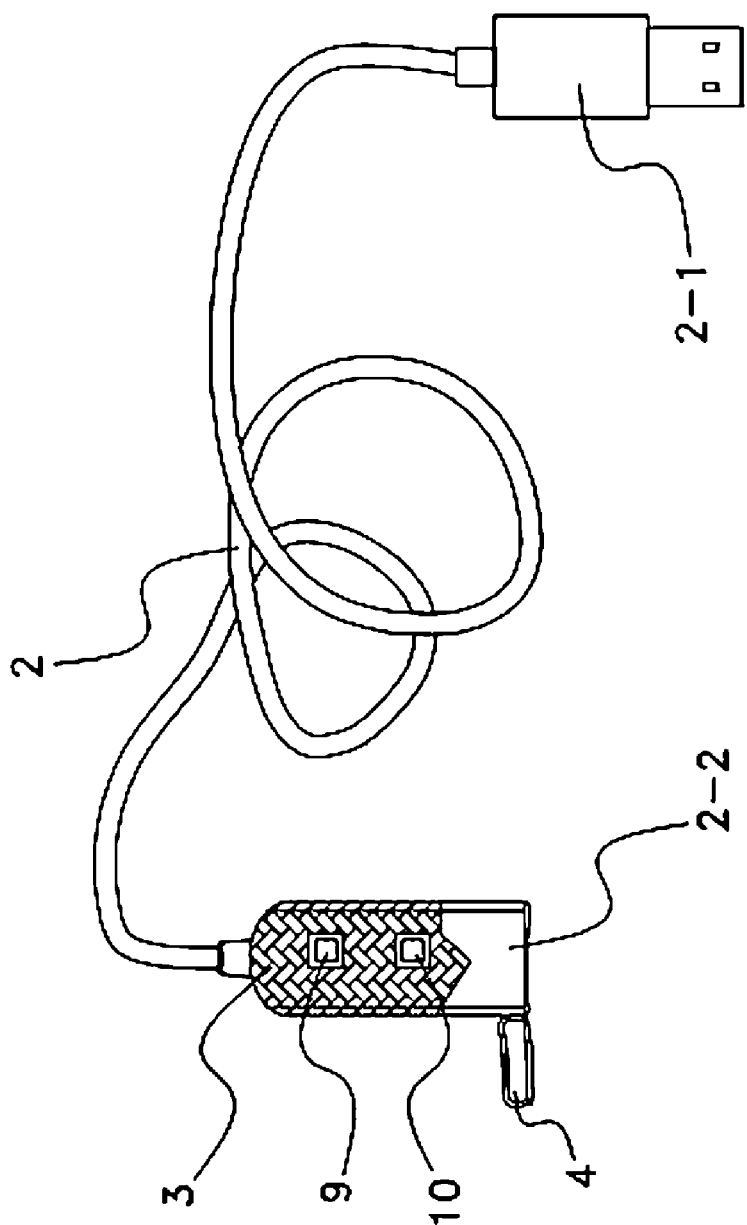

FIGS. 1-2 depict an example of a bag for convenient charging according to the present invention. As shown, there is a luggage body (1) having a placing space for placing a power storage device inside the luggage body and a power cable outlet on the outer surface of the luggage body (1); a USB extension cable (2) having a male connector (2-1) and a female connector (2-2) on the luggage body (1), wherein the male connector (2-1) of the USB extension cable is inside the luggage body (1) and is used to connect to the power storage device in the placing space; wherein the female connector (2-2) is in the power cable outlet or exposed outside the power cable outlet, and the female connector (2-2) is equipped with a sheath (3) wrapped on the outer surface of the female connector (2-2) for water proofing. The term "luggage body" includes any bag, bag body, purse, backpack, luggage or the like. The placing space would typically be a pocket on the inside of the luggage body that holds the power storage device. The power storage device may be any device capable of charging a device. The sheath (3) may be further equipped with a dust cap (4) for dust proofing. The power cable outlet is provided on the surface of the luggage body, the female connector (2-2) is exposed outside the power cable outlet, and the dust cap (4) is attached on the side of the female connector (2-2). The power cable outlet may be provided in a groove (5) on the side of the luggage body, the female connector is in the power cable outlet, and the dust cap is at the opening of the groove and connected to the groove. The power cable outlet may be under the sheath (3) and therefore not viewable in FIG. 1. This allows the USB extension cable (2) to be on the inside of the bag or body and connect to, for example, a power bank contained on the inside of the bag or luggage body. The luggage body may be provided with a cable laying channel from the power storage device placing space to the power cable outlet for the penetration of the USB extension cable (2). The male connector of the USB extension cable is further equipped with a wireless technology standard for exchanging data over short distances (e.g. Bluetooth™) as an anti-loss alarm (9), which is used to connect to the device on the product to be charged. The Bluetooth™ on the USB extension cable would connect with the Bluetooth™ on, for example, a phone and could be used to locate the luggage body. The male connector of the USB extension cable may be further equipped with a GPS device (10) for positioning. The term positioning may be interchanged with locating. The power cable outlet may be on a shoulder strap (11) of the bag. The sheath as depicted in FIGS. 1 and 2 is a woven material or a plastic material that has at least one ventilation opening (the woven layers provide openings between each of the woven layers). The openings are small, as to protect the female connector contained inside.

During traveling, when the battery of the product to be charged is dying, it is only necessary to plug the external USB connecting line 12 to the female connector 2-2 of the USB extension cable 2, then the charging starts, without necessarily opening the bag or luggage, nor taking out the power source for charging.

FIG. 2 shows embodiment 2 of the utility model, which is different to the embodiment 1 that the sheath 3 is further equipped with a dust cap 4 for dust proofing, and the dust cap 4 is attached on the side of the female connector 2-2, which is overturning connected to the side of the female connector 2-2.

FIGS. 3, 4, 5, 6, 7, 8, 9, 10 and 11 are intended to depict that the raised portion of the sheath may take many shapes and forms. FIG. 3, for example depicts a curved raised portion (30), FIG. 4, depicts a curved raised portion (32) with a surrounding bottom portion (34). FIG. 5 depicts a raised substantially rectangular shape (36) with a surrounding bottom (38) which retains the output operative end of a female connector in a second open end (39) of the sheath to provide the female connector in a flat position and protected by a first side portion (40) and second side portion (42). The raised portion has a first closed end (41), a second open end (39) and the surrounding bottom portion (38) surrounds at least a portion of the raised portion FIG. 5 also include an actuation button (37) in the top side of the sheath. The first side portion (40) and the second side portion (42) also act to guide the output operative end of a female connector into the open end of the sheath. FIG. 6 depicts an example of a dome shaped raised portion (44). FIG. 7 depicts an example of a raised circular shape (46). FIG. 8 depicts an example of a raised semi-circular shape (48). FIGS. 9 and 11 depicts examples of raised polygon shapes (e.g. 50 and 54). FIG. 10 depicts an example of raised square shape (52).

FIGS. 12 and 13 are intended to show the sheath attached to a body and two different examples of openings between the inner surface and outer surface of the body. As shown, the sheath (60) has a raised portion and a surrounding bottom portion, wherein the raised portion has a first closed end, a second open end and the surrounding bottom portion surrounds at least a portion of the raised portion (see FIG. 5 for additional detail). At least a portion of the raised portion extends above an outer surface of a body (in this case shoulder strap (62)). The body has an inner surface (inside of shoulder strap 64), an outer surface (66) and a fourth opening (68) between the inner surface and the outer surface. Ash shown in FIG. 12, the fourth opening is a zipper that is adjacent to the sheath to allow for adjustment or removal of the USB cable (70). FIG. 13 depicts an example in which the fourth opening (72) is near or adjacent to the location of the sheath (76). The sheath may be on top of and cover the fourth opening (72). This may be permanently fixed and not allow for removal of the USB cable (74). The fourth opening is between the inner surface and the outer surface, and the raised portion receives a female connector having an operative end and a cord end and a cord in communication with the cord end. FIGS. 14, 15, 16 and 17 are intended to depict an example of how the USB cable may be received in the sheath. FIG. 14 is a top view of a sheath with an actuation button (75) and second open end (77). Note the bottom surrounding portion in not shown in FIG. 14. FIGS. 15 and 16 depict a bottom view of a sheath with a bottom surrounding portion (80). The operative end (76) of the female connector is retained in the second open end (82) of the raised portion and the cord end of the female connector is retained in the first closed end (100) of the raised portion to provide the female connector of the UBS cable in a flat position with the operative end of the female connector being operable and above the outer surface of the body. The surrounding bottom portion of the sheath is attached to a portion of the body. FIGS. 17 and 18 are intended to depict that a portion of the body may have a fourth opening (92). FIG. 17 depicts the outer surface (96) of the body and FIG.

18 depicts the inner surface (94) of the body. The raised portion (98) of the sheath may be a corresponding size and shape to the fourth opening. The sheath has a first closed end (100), top side (102), right side (104), left side (106). In this way the surrounding bottom portion is under the outer surface of the body (96). This acts to secure the sheath with the surrounding portion not seen and provides stability. See FIG. 12, the cord is connecting between the female connector (69) and a battery (65) inside of the body. The battery (65) may be held inside a power storage space (67). The cable laying channel is built on the body, from the sheath to the power storage space inside of the body. The power storage space may be a pocket on the interior of a bag as shown. The female connector may have an actuation button (75). If the female connector has an actuation button, there may be a third opening (81) in the sheath that is similarly shaped to allow the actuation button to be actuated and surrounds the actuation button. The actuation button may actuates the function of recording and storing voice recording, photoshooting, music controlling or any other function on a phone, tablet or other device. See FIG. 88, 89, the actuation button (8901) may be on a mainboard (8801), and further equipped with a wireless technology standard for exchanging data over short distances as an anti-loss alarm, which is used to connect to the device nearby to be charged. A corresponding side of the sheath has at least one corresponding button communicating with the top of the actuation button, which connects to the mainboard of the female connector. The mainboard in the female connector has a Bluetooth actuator for connecting and controlling a device nearby to be charged. The mainboard may further comprises a memory card (8902). There may be a GPS device for positioning contained in the female connector.

Figure 19:
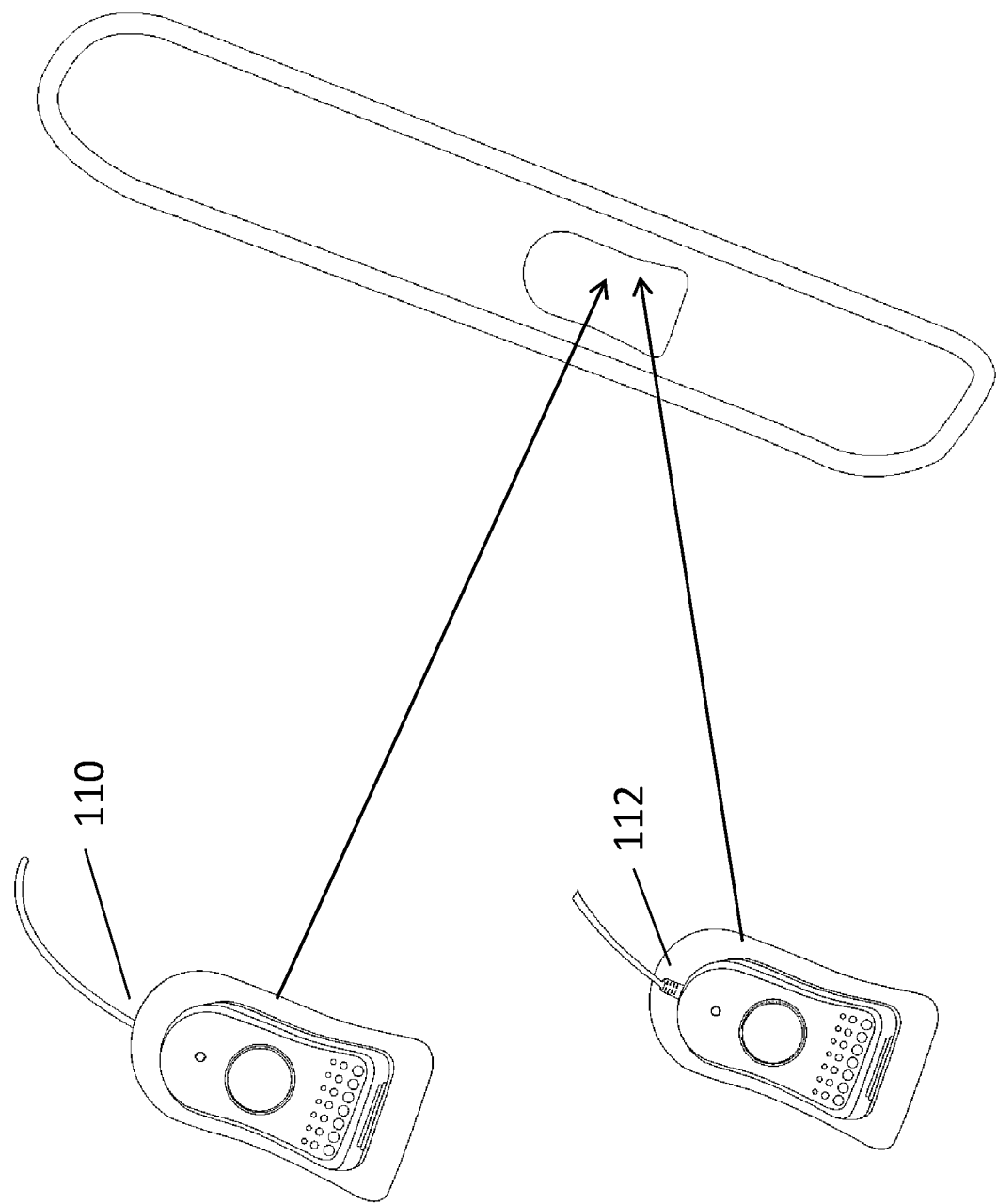

FIG. 19 depicts two options of the location of the cord. The cord (110) may remain under the inner surface of the body (under the surrounding bottom portion) and stay in the cable laying channel. Alternatively, the cord (112) may be on top of the outer surface of the body (above the surrounding bottom portion).

FIGS. 20 and 21 depict the sheath (114) with a third opening (116) that may receive a female connector/USB interface connector (118) that sits inside the third opening (116). FIGS. 22 and 23 depict one example of a sheath with a first closed end (120), a left side (122), a right side (124), a top side (126), a surrounding bottom portion (132), third opening (130), second open end (128) and actuation button (134). FIGS. 24, 25, 26, 27, 28 and 29 depict the female connector/USB interface convertor. FIG. 24 is a lower view, FIG. 25 is a top view, FIG. 26 is an upper view, FIG. 27 is a perspective view, FIG. 28 is a side view and FIG. 29 is a bottom view. There is a female operative end/USB output operative end (150), an actuation button (152) and input operative end (154).

FIGS. 30, 31, 32, 33 and 34 depict the female connector/ USB interface convertor with input and output cables. A is used to designate the input operative end (158) a detachable cable. B is the female operative end/output operative end (156).

Figure 35:
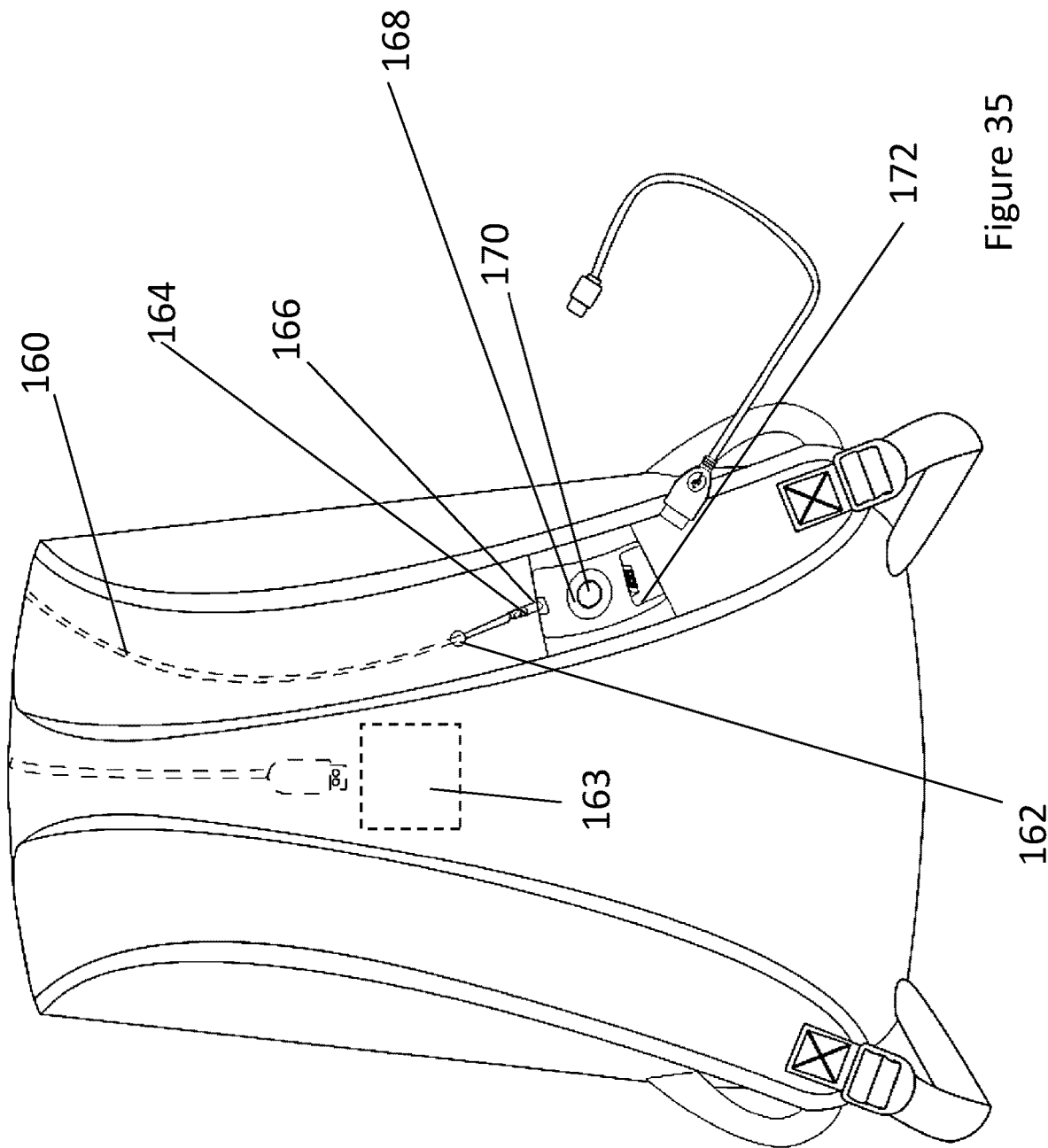

FIG. 35 depicts the body is provided with a cable laying channel (160) from a power storage device placing space to the opening between the inner surface and the outer surface of the body for penetration of the USB extension cable. The fourth opening (162) is on the body adjacent to the sheath to remove and place the wireless charger inside of the sheath. This embodiment also the fourth opening (162) at the end of the cable laying channel (160) to keep the cord end (164) outside of the channel. The raised portion of the sheath has a first open end (166), a second open end (172) and a surrounding bottom portion surrounding at least a portion of the raised portion, and at least a portion extends above an outer surface of a body. The raised portion receives a female connector having an output operative end, an input operative end and a detachable cord connecting between the input operative end and a battery inside of the body. The output operative end of the female connector is retained in the second open end (172) of the raised portion and the input operative end is retained in the first open end (166) of the sheath to provide the female connector in a flat position with the operative ends being operable and above the outer surface of the body, wherein the surrounding bottom portion is attached to a portion of the body, wherein one of the sides of the female connector has an actuation button. The third opening (168) surrounds the actuation button (170).

Figure 36:
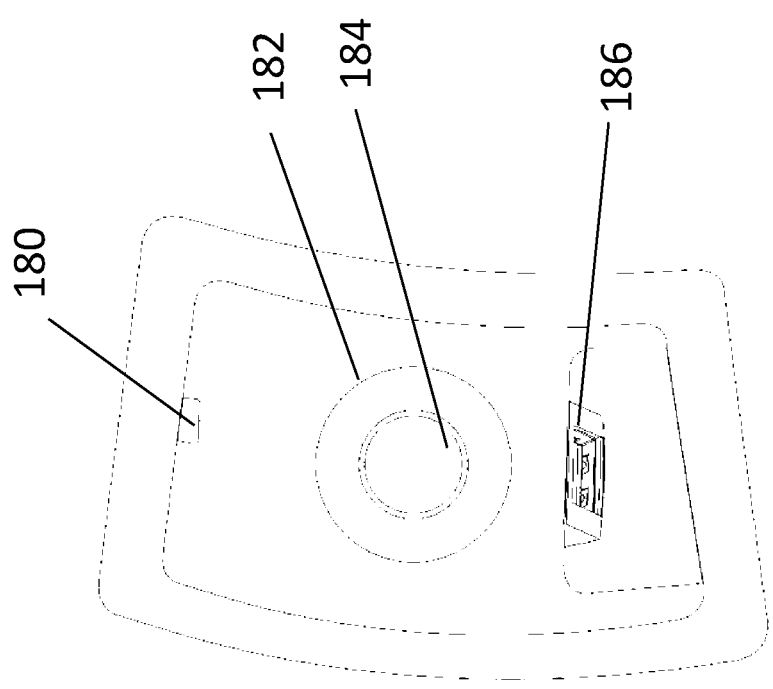

The body is provided with a cable laying channel (160) from a power storage device (163) placing space to a fourth opening (162) adjacent to the sheath and leaving the cord end (164) outside of the cable laying channel (160). FIG. 36 depicts a sheath with a first open end (180), third opening (182), actuation button (184) and output operative end (186). FIG. 36 depicts that the substantially rectangular raised portion may have a slight curve. This is particularly useful for shoulder straps the contour comfortably to the shoulders and chest of the user.

Figure 37:
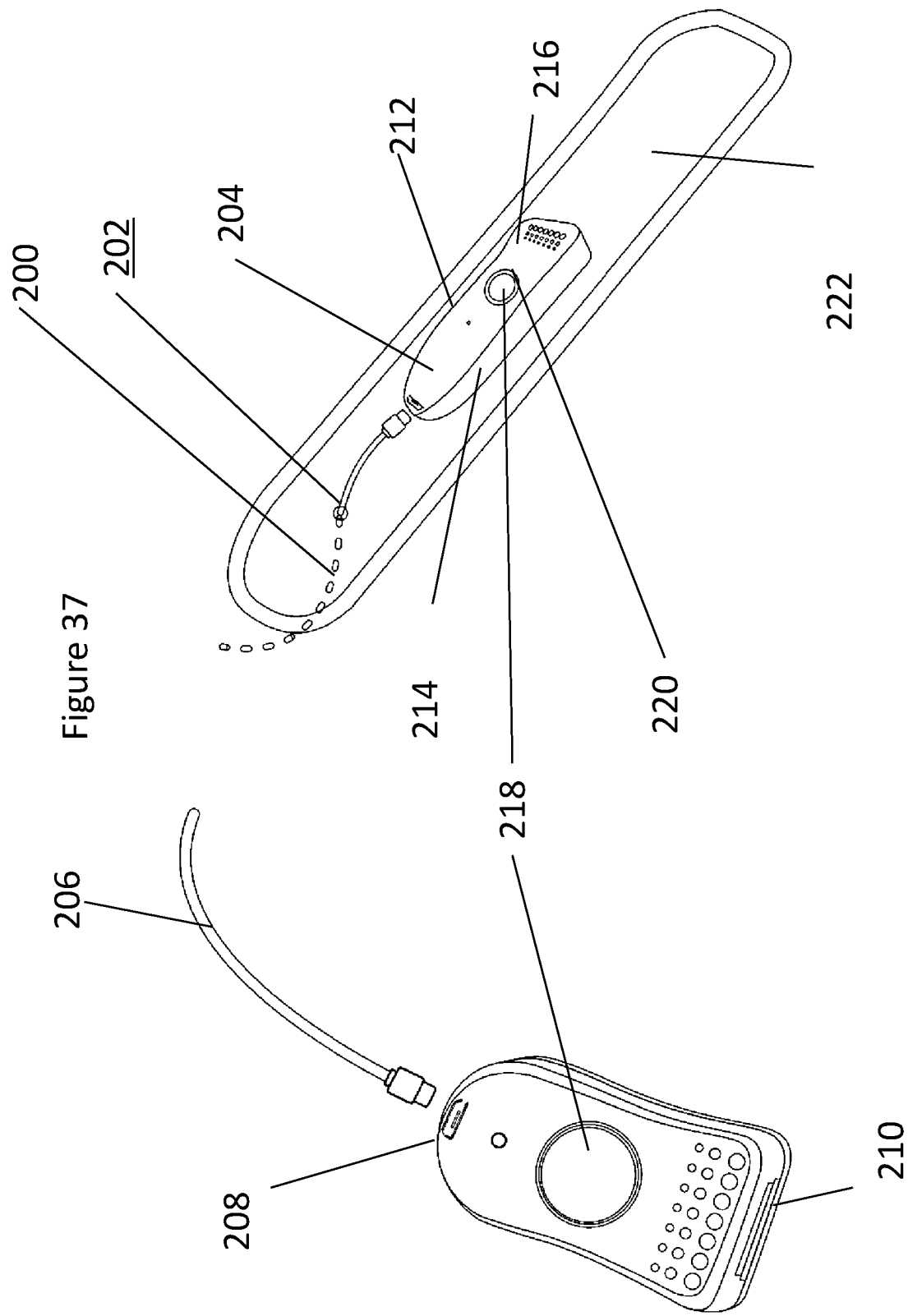
Figure 38:
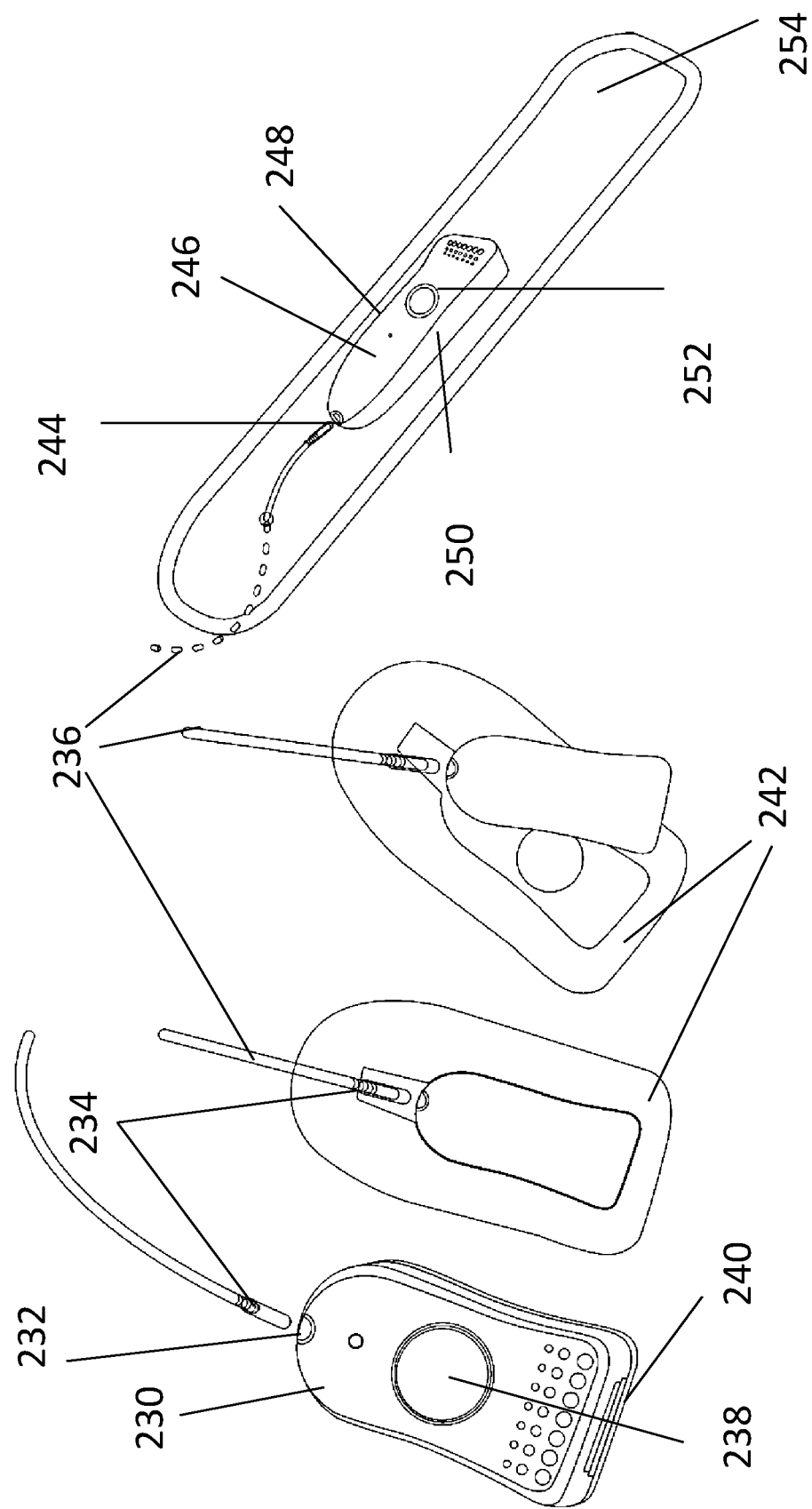

FIG. 37 depicts the body is provided with a cable laying channel (200) from a power storage device placing space to a fourth opening (202) adjacent to the sheath (204) having a left side (214), right side (212), top side (216), outer surface of a body (222), third opening (220), actuation button (218) and leaving the cord end (206) outside of the cable laying channel (200). The cord end (206) may detachably connected to the input operative end (208) of the female connector which is opposite the output operative end (210). FIG. 38 depicts the female connector (230), input operative end (232), cord end (234), cord (236), actuation button (238), second open end (240), surrounding bottom portion (242), first open end (244), top side (246), right side (248), left side (250), third opening (252) and outer surface of body (254).

Figures 39, 40:
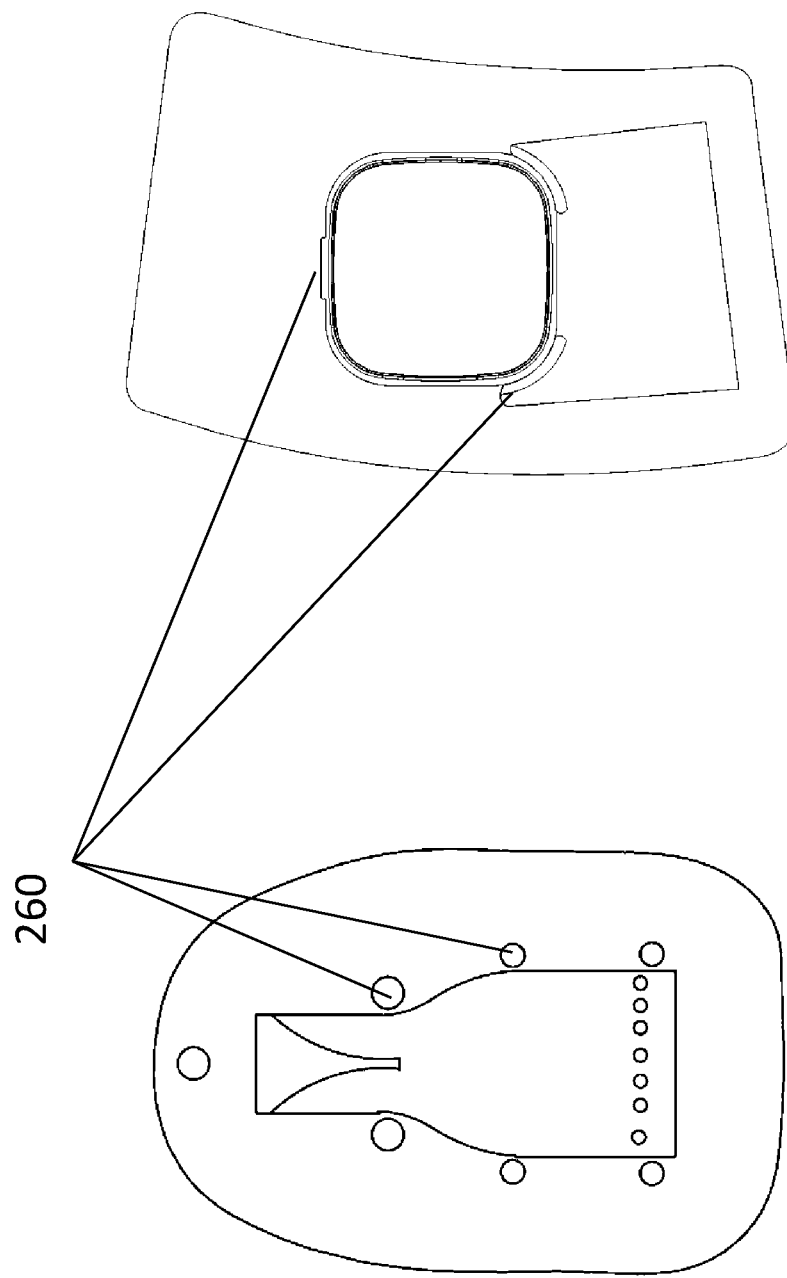

FIGS. 39 and 40 depict that the inside surface of the sheath further comprises at least one limit point (260) to maintain the female connector to stay tightly in place. The limit point also prevents the USB cable from being pulled or dislodged during use.

Figure 41:
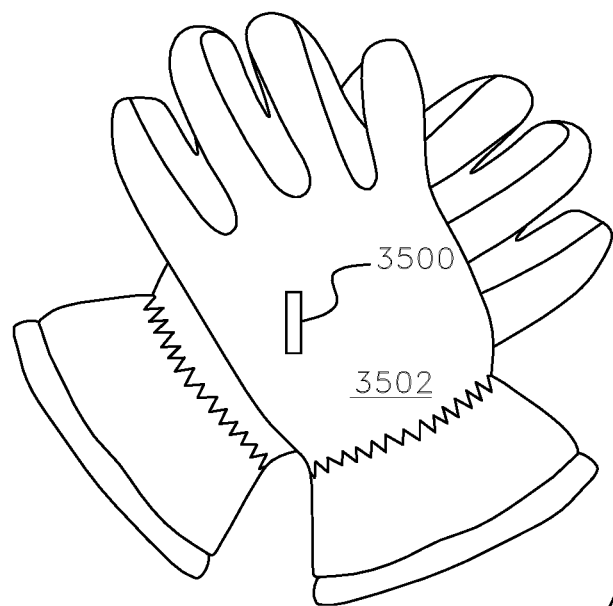
Figure 42:
Figure 43:
Figure 44:
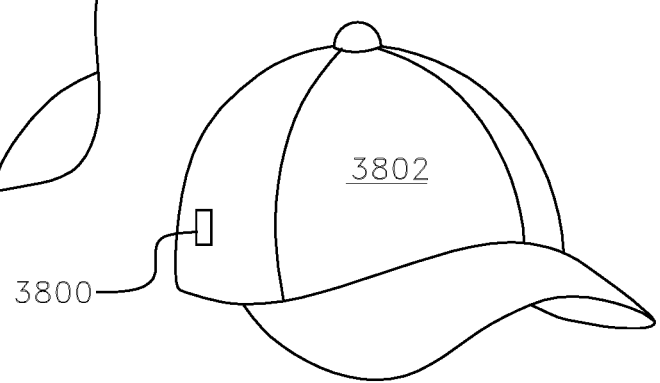
Figure 45:
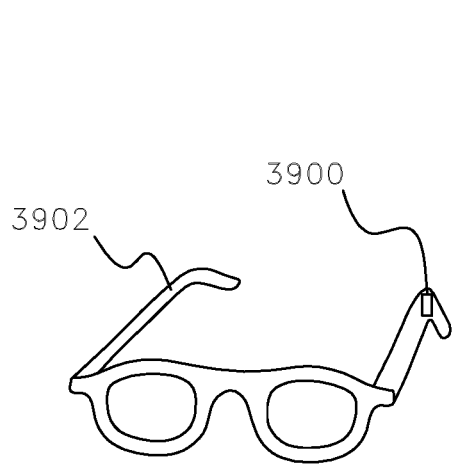
Figure 46:
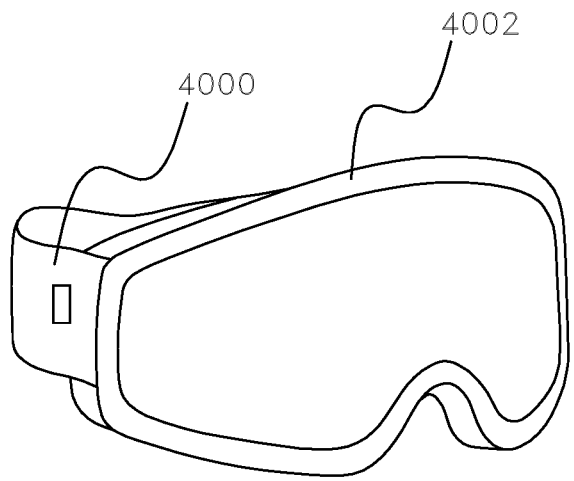
Figure 47:
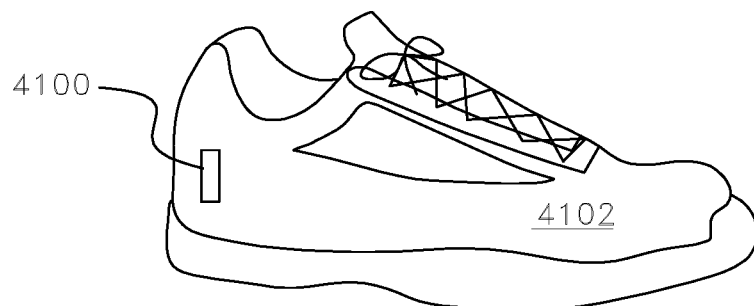
Figure 48:
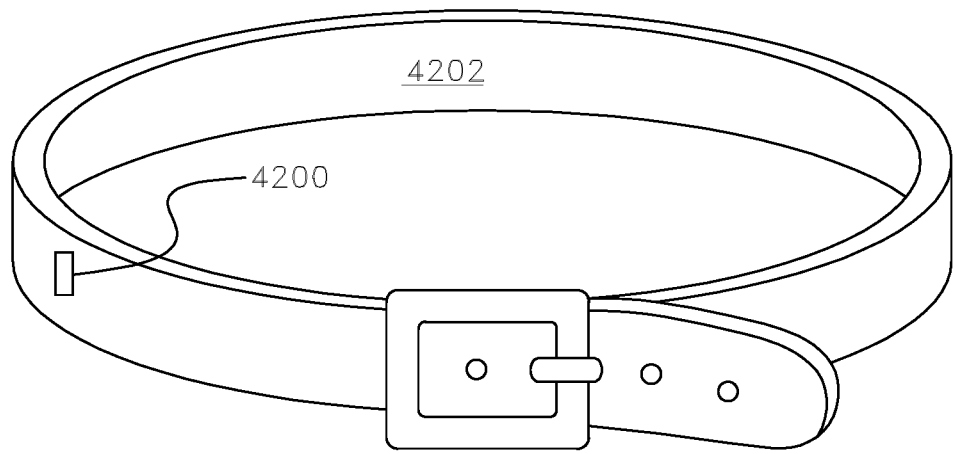
Figure 53:
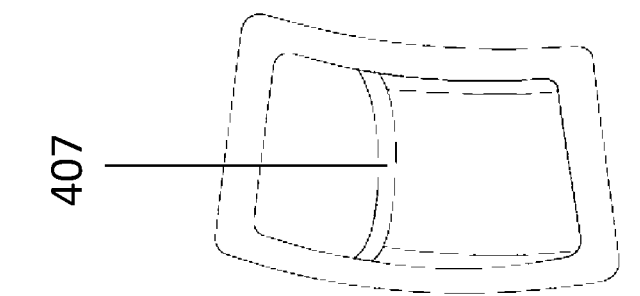
Figure 52:
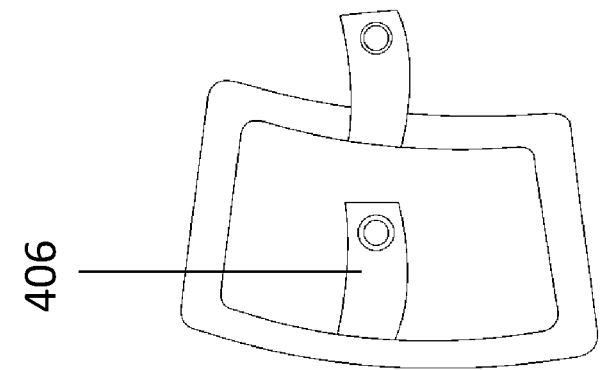
Figure 51:
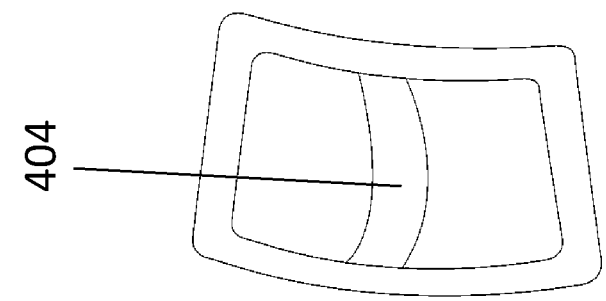
Figure 50:
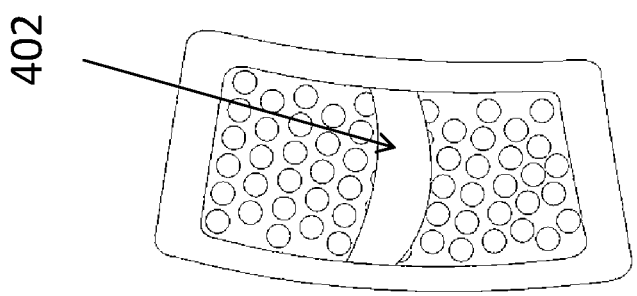
Figure 49:
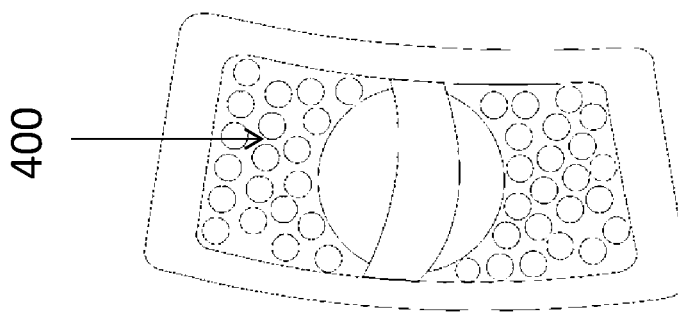
Figure 57:
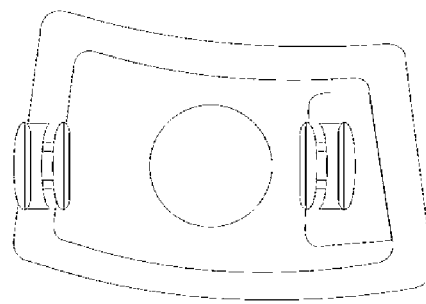
Figure 56:
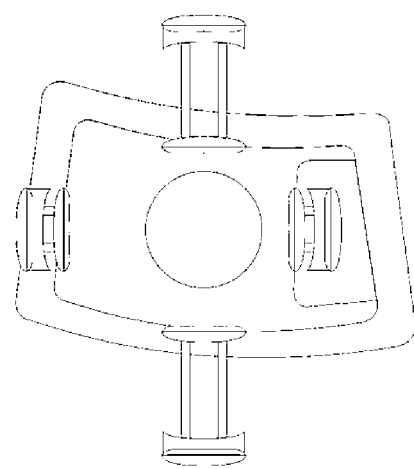

FIGS. 41, 42, 43, 44, 45, 46, 47 and 48 depict difference examples of a body. This is by limitation only and intended to depict that the sheath is intended to be attached to many different types of body that can be worn or carried by a user. FIG. 41 depicts a sheath (3500) on gloves (3502). FIG. 42 depicts a sheath (3600) on a jacket (3602). FIG. 43 depicts a sheath (3700) on socks (3702). FIG. 44 depicts a sheath (3800) on a hat (3802). FIG. 45 depicts a sheath (3900) on glasses (3902). FIG. 46 depicts a sheath (4000) on goggles (4002). FIG. 47 depicts a sheath (4100) on sneakers (4102). FIG. 48 depicts a sheath (4200) on a belt (4202). The sheath as may have a bottom side with an opening (83) to allow the female connector to sit in the raised portion and the cord of the USB to go through the bottom side opening. A cover may extend above a shoulder strap and holds the actuation device in a first opening that aligns with a power output port and a second opening that aligns with the actuation button and having a recessed portion. The bottom side of the raised portion may have a bottom side opening to allow the female connector of the USB cable to sit in the sheath and the cord of the USB to go through the bottom side opening. There may be a cover that extends above a shoulder strap and holds the actuation device in a first opening that aligns with a power output port and a second opening that aligns with the actuation button and having a recessed portion.

According to another aspect of the present invention, wireless charging in envisioned. This differs from the previously described embodiments in that the device to be charged is not plugged into a USB extension cord, but rather is wirelessly charged by contact with a wireless charging pad. FIGS. 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 90, 91, 92, 93, 94, 95, 96, 97, 98, and 99 depict wireless charging embodiments according to the present invention.

Figure 63:
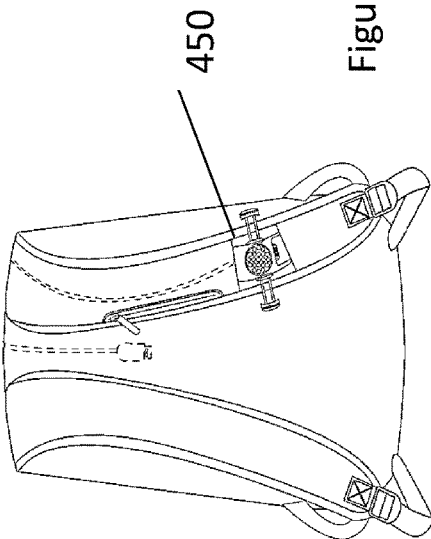

A sheath for convenient charging, comprising: a raised portion with a fixed holder (360) for mobile phone and a bottom portion (362), and at least a portion of the bottom portion communicating with a body, wherein the fixed holder for mobile phone is extends above a surface of a body, and adjustable to tightly hold different sizes, different shape of mobile phone, wherein the sheath has an opening (364), the rear side (366) of raised portion receives a wireless charger (412), and the wireless charger stays inside of the raised portion, and can be removed from the opening of the sheath, wherein the raised portion and the fixed holder are positioned to make the wireless charger and mobile phone communicate with each other. This provides a stable position for a mobile phone or other device to charge wirelessly on the outer surface of the body. The rear side of raised portion receiving the wireless charger further comprises at least one adjustable limit point, to hold the wireless charger stay in place (See FIGS. 58 and 59 for limit points (408)). The adjustable limit points (408) hold the wireless charger (412) in opening (410). FIG. 63 depicts the wireless charger on the shoulder strap (450).

The holder for mobile phone may have vacuum suctions (400) to hold a device to be charged (e.g. a phone, music player, etc.), an adjustable gripper (402), elastic band (404), woven strip (404), a regular pocket (407), band with fasteners (406). The surface of the body may be inside of a bag pocket (9305), see FIG. 99.

Figure 92:
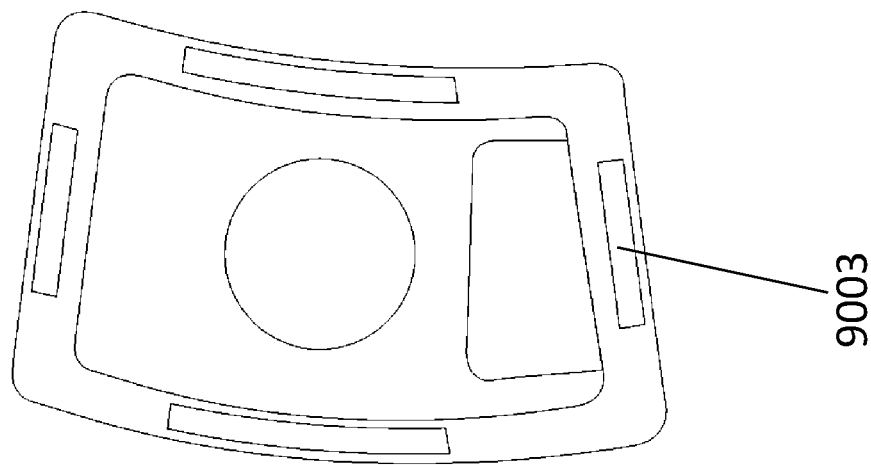
Figure 91:
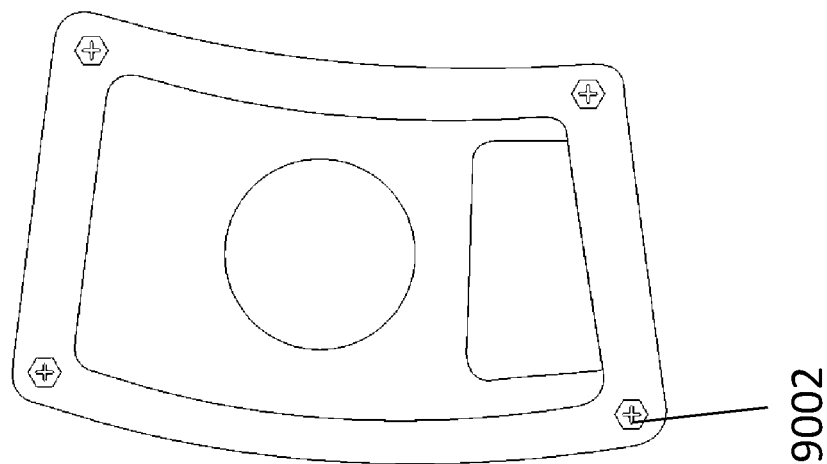
Figure 90:
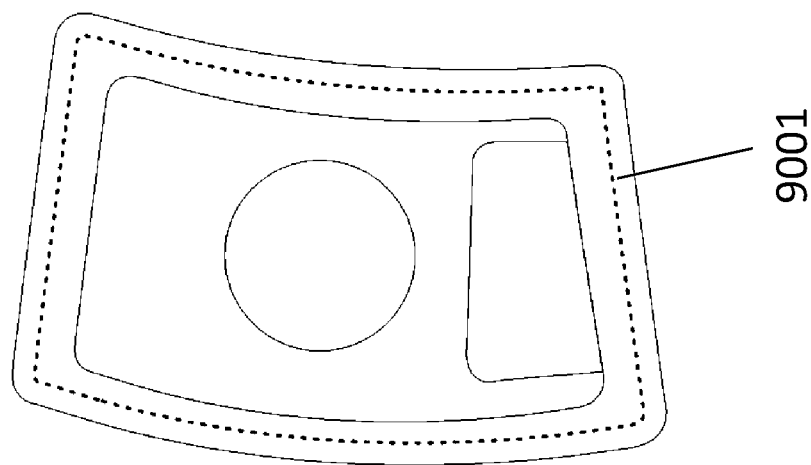

FIGS. 90, 91 and 92 depicts the bottom portion of the sheath communicates with the body by an attachment means attaching the sheath to the body, wherein the attachment means is selected from the group consisting of stitching (9001), glue (9003), rivet (9002), screw (9002).

Figure 55:
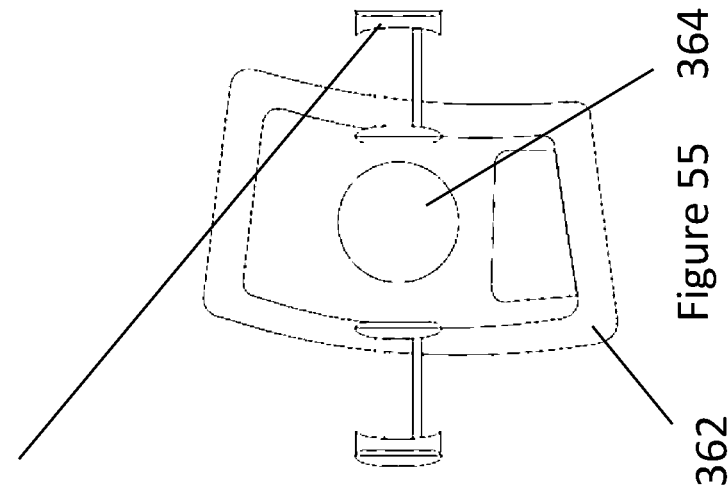
Figure 54:
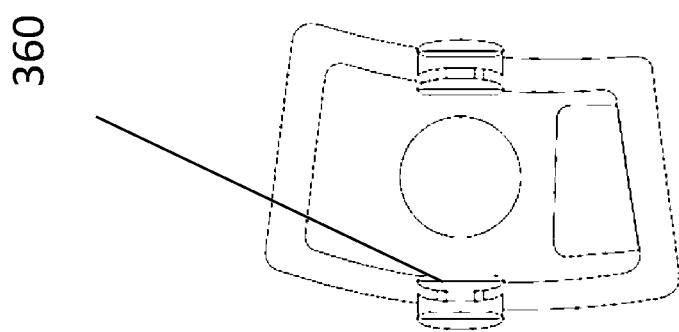
Figures 58, 59:
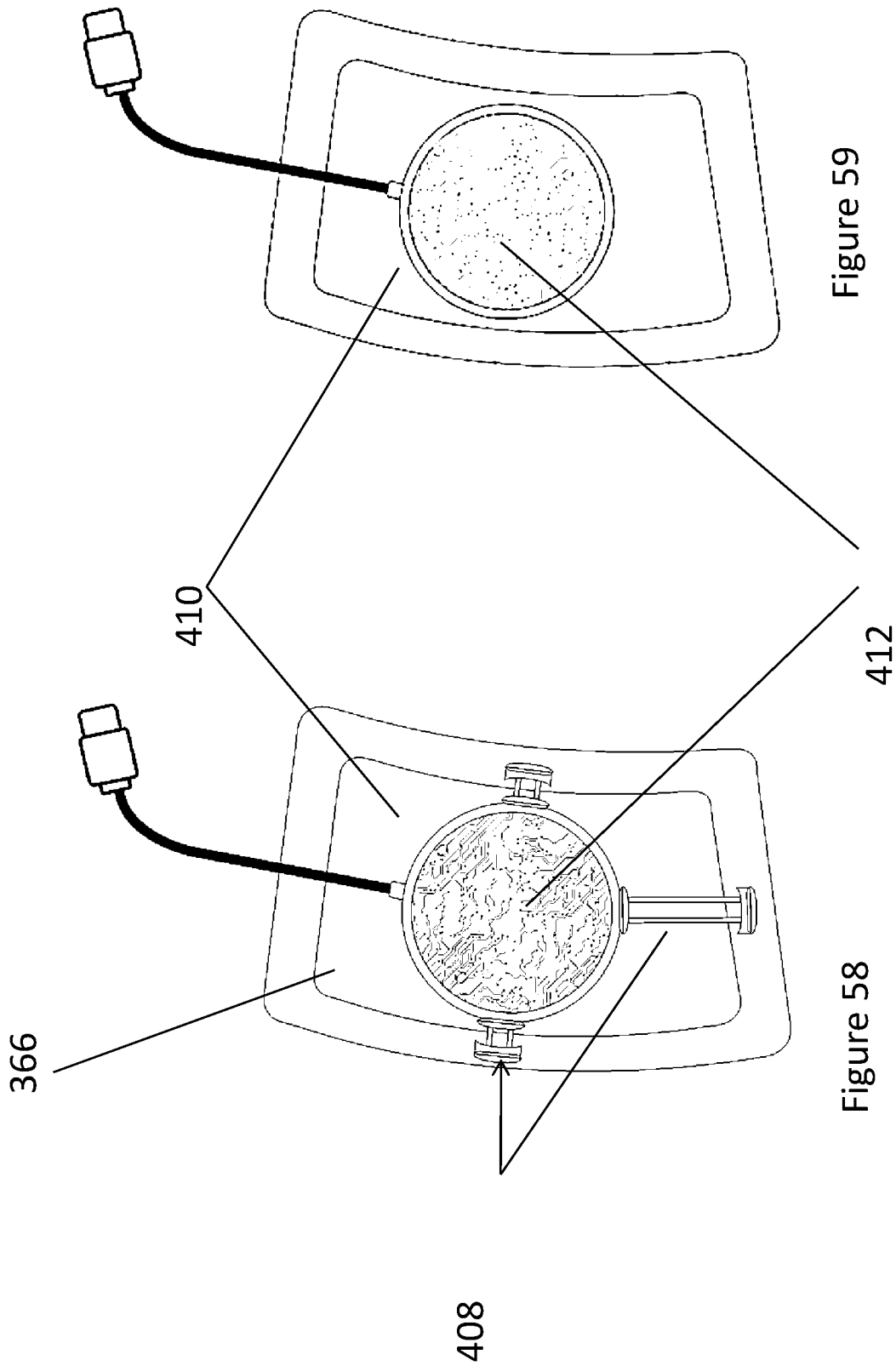
Figure 62:
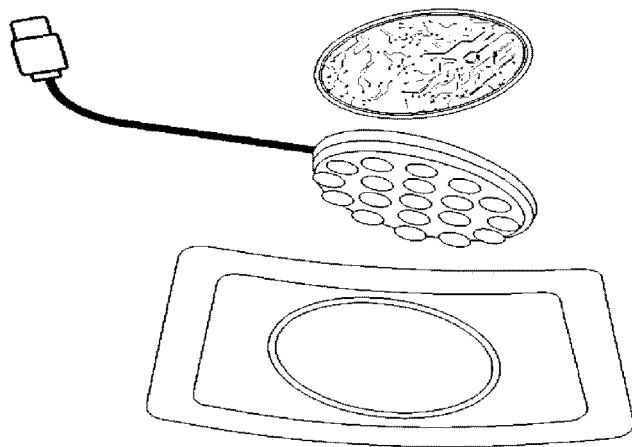
Figure 61:
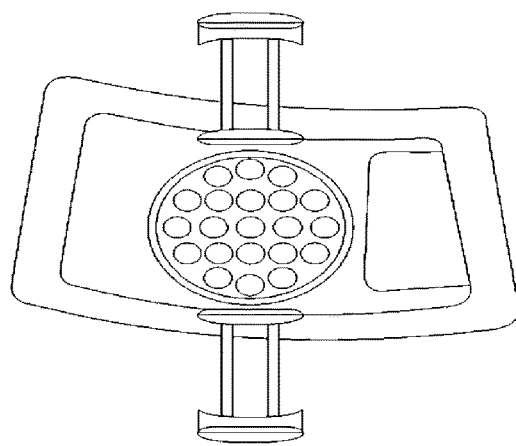
Figure 60:
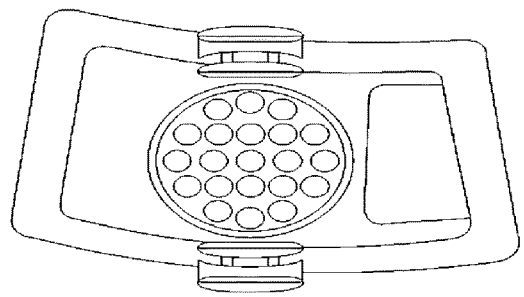
Figure 93:
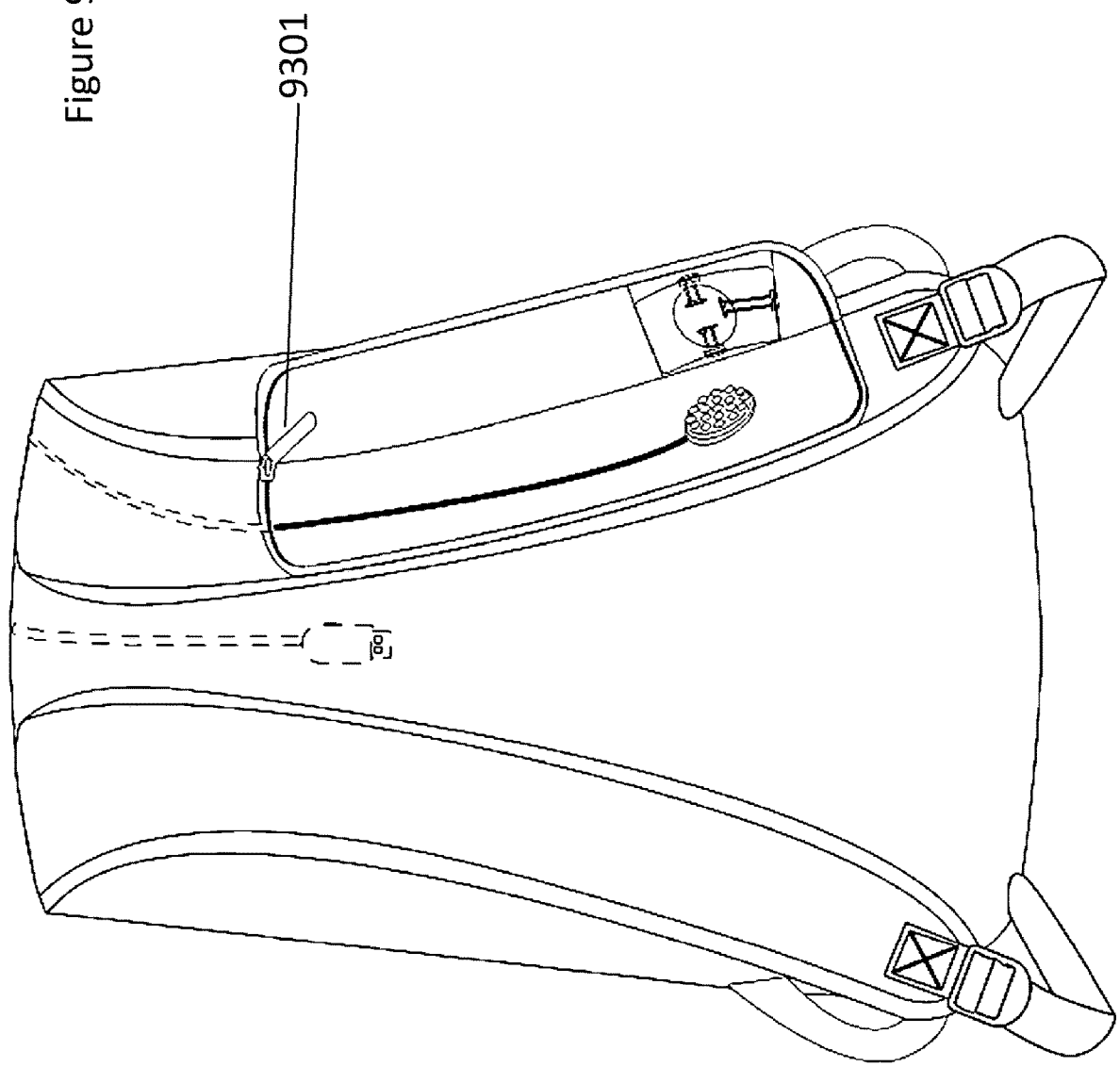
Figure 98:
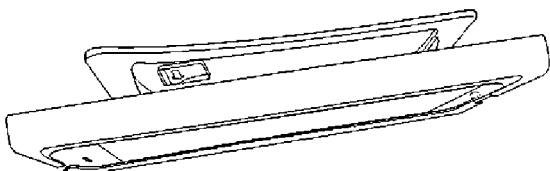
Figure 97:
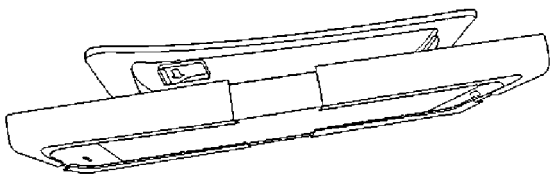
Figure 96:
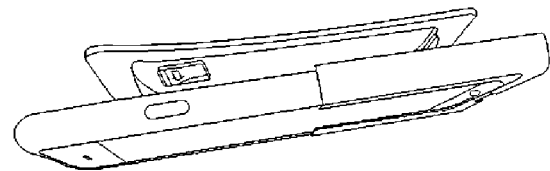
Figure 95:
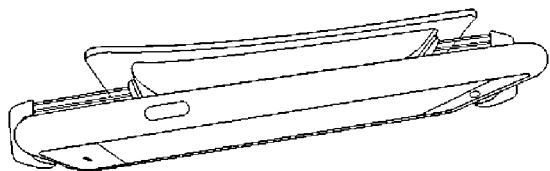
Figure 94:
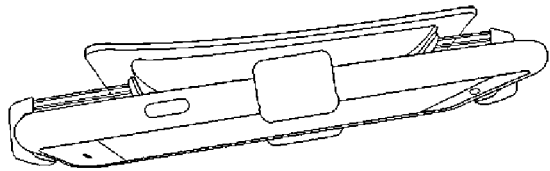
Figure 99:
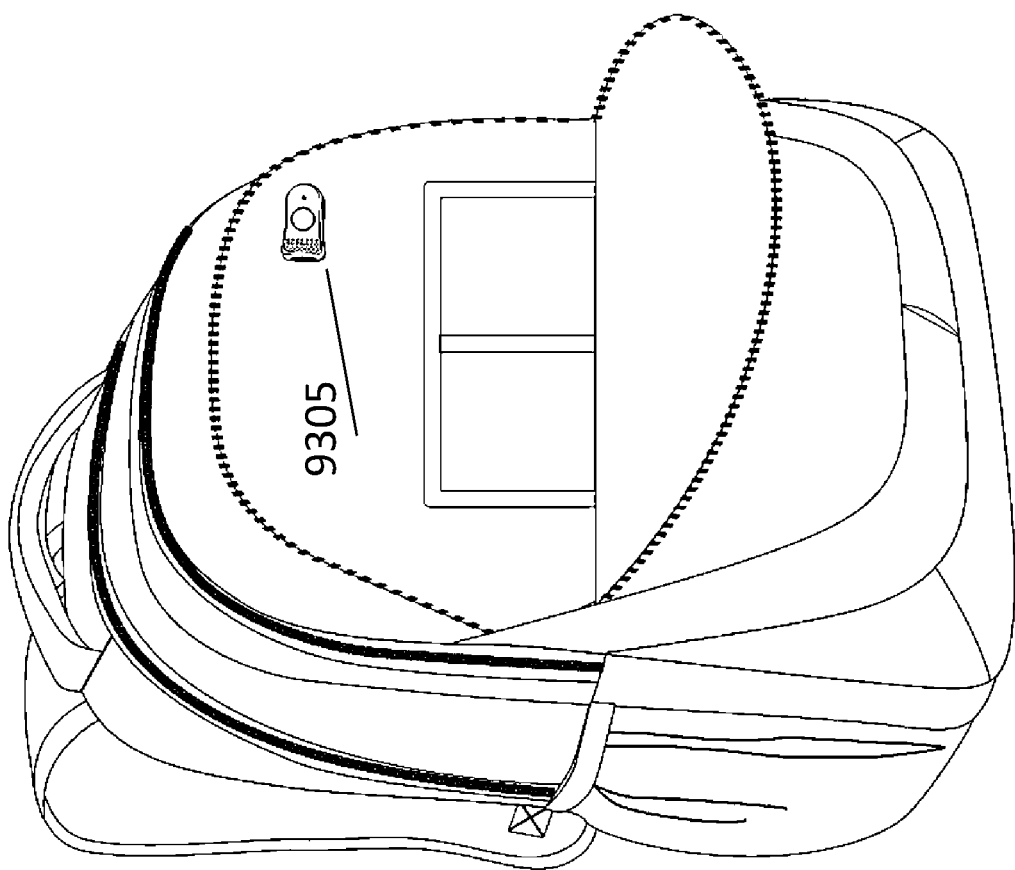

FIG. 55 depicts the raised portion further comprises a fifth opening (364), the wireless charger and mobile phone in wireless communication with each other. FIG. 93 depicts a fourth opening (9301) is on the body adjacent to the sheath to remove and place the wireless charger inside of the sheath.

FIGS. 64, 65, and 66 depict a sheath for convenient charging, comprising: a raised portion with a second open end (500), and a bottom portion (502), a power storage space in the body, and a magnet component (504), a USB cable having a female connector with an operative end, wherein the magnet component is configured to receive a mobile phone wireless charging holder which has a magnetic adjustable component (504), wherein at least a portion of the bottom portion is in communication with a body (506), wherein, at least a portion of the sheath extends above a surface of a body, wherein the operative end of the female connector is retained in the second open end (500) of the raised portion to provide the female connector of the UBS cable in a firm and flat position with the operative end of the female connector being operable and above the surface of the body, wherein an exit on the body is adjacent to the sheath for the cable going through, which connects the female connector in the sheath to a power storage space in the body, wherein the mobile phone wireless charger connects to the operative end of the female connector. The device may have a magnet (508) to retain the device for wireless charging.

Figure 68:
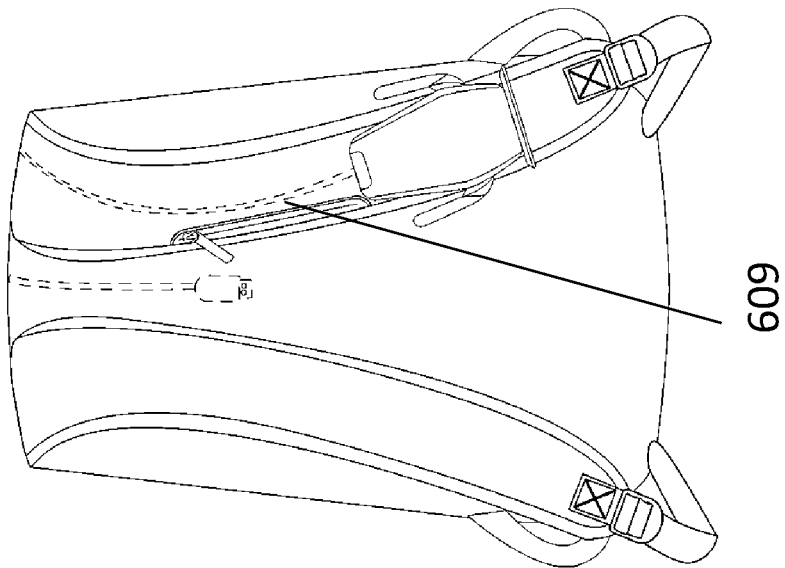
Figure 67:
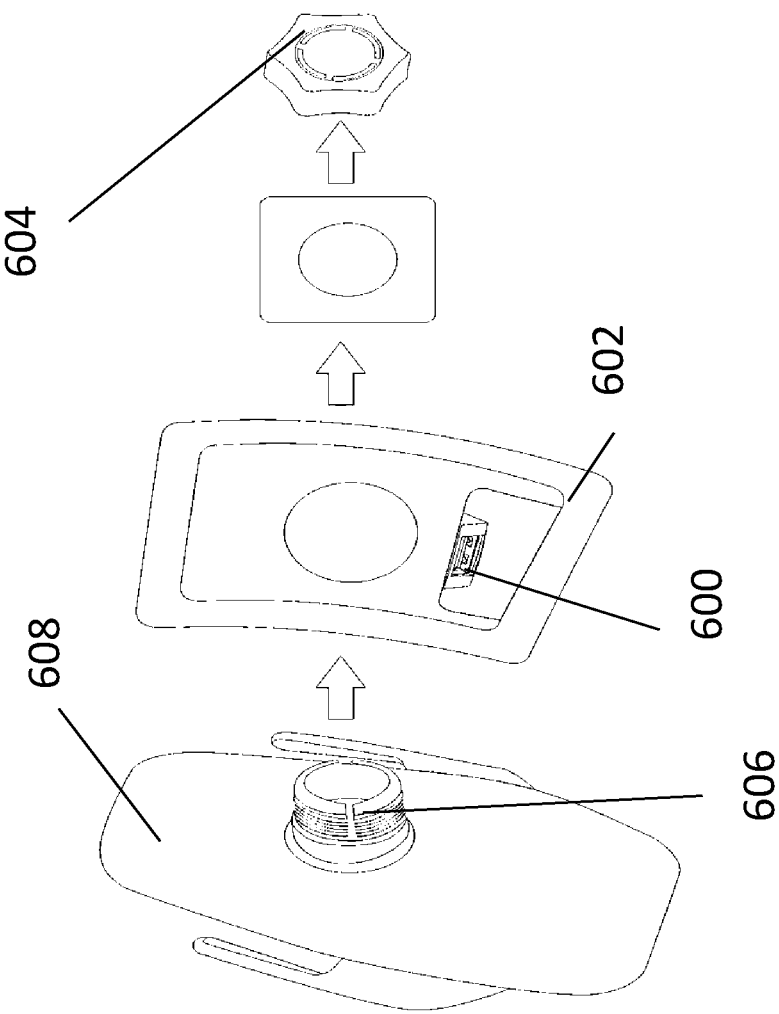
Figure 74:
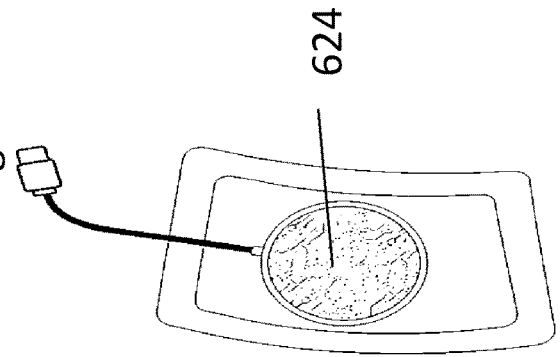
Figure 73:
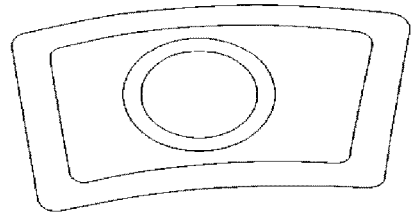
Figure 72:
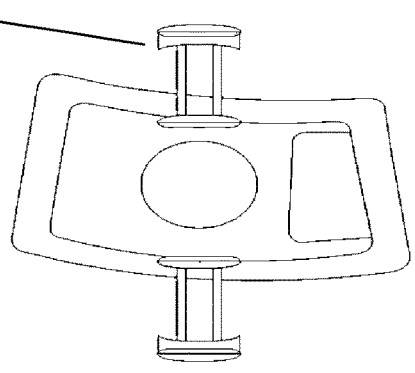
Figure 71:
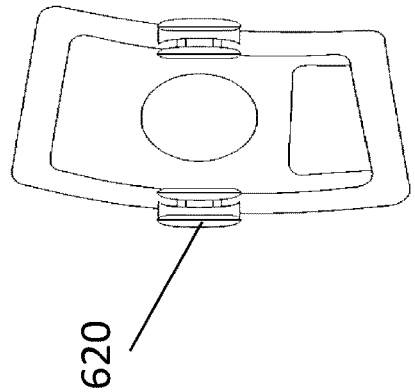
Figure 79:
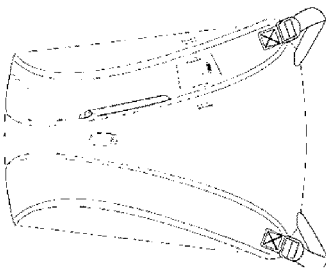
Figure 78:
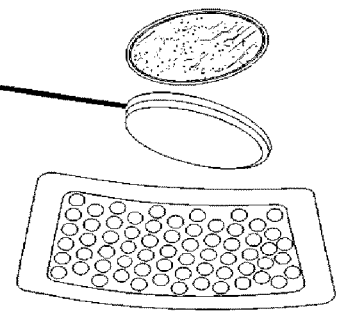
Figure 77:
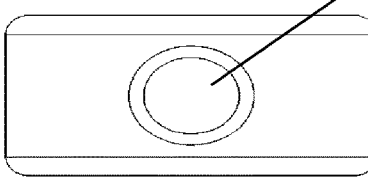

According to another embodiment, the device for wireless charging may be retained by a universal adaptation nut, as depicted in FIGS. 67 and 68, depicting a sheath for convenient charging, having a raised portion with a second open end (600), a bottom portion (602), a power storage space in a body, and a universal adaptation nut (604 and 606), wherein the universal adaptation nut is configured to receive a mobile phone wireless charging holder (608). It should be noted that the wireless charging holder may be purchased by the user and is apart from the sheath, the universal adaption nut is configured to receive any such wireless charging holder. At least a portion of the bottom portion is in communication with the body, at least a portion of the sheath extends above a surface of the body, the operative end of a female connector is retained in the second open end (600) of the raised portion to provide the female connector of the UBS cable in a firm and flat position with the operative end of the female connector being operable and above the surface of the body, an exit on the body is adjacent to the sheath for the cable (609) going through, which connects the female connector in the sheath to a power storage space in the body, the mobile phone wireless charger connects to the operative end (610) of the female connector.

Figure 76:
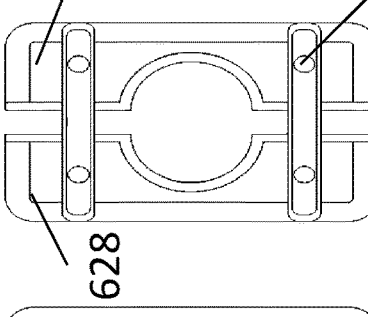
Figure 75:
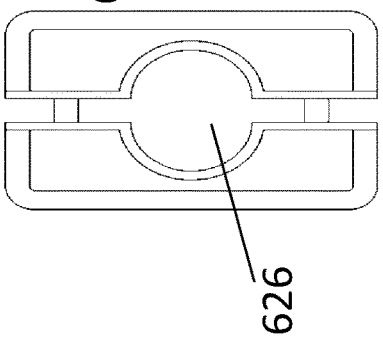

A sheath for convenient charging, comprising: a raised portion with a fixed adjustable mobile phone holder and a bottom portion, wherein the fixed adjustable mobile phone holder is adjustable to tightly hold different sizes, different shape of mobile phone, wherein the raised portion contains wireless charging components that are fixed inside of the sheath, wherein the sheath is on a body with a cable laying channel going from the sheath to a power storage space in the body, wherein at least a portion of the bottom portion is in communication with the body, wherein the raised portion and the fixed holder are attached to make the wireless charger and mobile phone is communication with each other, providing a stable position for a mobile phone charging by a wireless charger on the outer surface of the body. FIGS. 71, 72, 73 and 74 depict an example of an adjustable mobile phone holder with an extendable left arm (620) and extendable right arm (622). The raised portion has a rear side that receives the wireless charger (624) and has an opening (626) to remove the wireless charger and allow for wireless charging. FIGS. 75 and 76 depict a different example of an adjustable mobile phone holder. There is a left portion (628) and a right portion (630) with at least one connecting bar (632) that allows the distance between the left portion (628) and right portion (630) to be adjusted to accommodate different sized devices. The at least one connecting bar (632) may act to attach the sheath to the body. The raised portion may further comprises a fifth opening (626), the wireless charger and mobile phone in communication with each other.

FIGS. 80, 81, 82, 83, 84, 85, 94, 95, 96, 97 and 98 depict a sheath (636) for convenient charging, comprising: a raised portion with a fixed holder (638) for mobile phone and wireless charger, wherein the fixed holder is adjustable to tightly hold the both mobile phone and wireless charger in different sizes, different shapes, wherein at least a portion of the sheath is firmly attached on a body, and at least a portion of the holder extends above an outer surface of the body (640), wherein the raised portion with a fixed holder is attached to provide the wireless charger and the mobile phone in communication with each other, providing a stable position for a mobile phone charging by a wireless charger on the outer surface of the body. As discussed above, an adjustable fixed holder is intended to retain a device in a position such that it can be wirelessly charged by a wireless charger that is retained inside the raised portion. Retaining the phone can take many forms such as vacuum suction, adjustable gripper, elastic band, woven strip and band with fasteners. The bottom portion of sheath is in communication with the body by an attachment means, wherein the attachment means is selected from the group consisting of stitching, glue, rivet and screw.

FIGS. 86 and 87 depict a sheath for convenient charging, comprising: a raised portion with a second open end, a bottom portion, a power storage space in a body, and a bracket (642) for fixing, wherein the bracket for fixing is configured to receive a mobile phone wireless charging holder (as shown above that bracket may be in the opening to get enough space to receive the clip on the wireless charger). The wireless charger may have a clip (644) that connects to the bracket (642) to retain the device in a proximity to the wireless charger to allow for charging. At least a portion of the bottom portion is in communication with the body, at least a portion of the sheath extends above a surface of the body, the operative end of a female connector is retained in the second open end of the raised portion to provide the female connector of the UBS cable in a firm and flat position with the operative end of the female connector being operable and above the surface of the body, an exit on the body is adjacent to the sheath for the cable going through, which connects the female connector in the sheath to a power storage space in the body, the mobile phone wireless charger connects to the operative end of the female connector. The bottom portion of the sheath is attached to the body by stitching, glue, rivet, screw.

There may be a second outer surface that covers the outer surface of the body. Similarly, the outer surface of the body may be the inside of a pocket. The outer surface onto which the sheath is mounted may have an additional cover or be on the inside of a pocket without departing from the present invention. The sheath may be attached to the body with the first tapered closed end above the second open end. Specially, the second open end is substantially parallel to the ground of the user. This is to say that the open end of the sheath faces the ground. This provides another level of dust and water protection to the operative end of the USB cable.

The specific embodiments above are only detailed explanation on the technical solutions of the utility model, and the utility model is not limited only by the embodiments above. Any improvement or replacement based on the principle of the utility model shall be within the protection scope defined in claims of the utility model.

The invention claimed is:

1. A sheath for convenient charging, comprising:
a raised portion with a second open end, a bottom portion, a power storage space in a body, a magnetic component and a USB cable having a female connector with an operative end,
wherein the magnetic component is configured to receive a mobile phone wireless charging holder which has a magnetic adjustable component,
wherein the raised portion is separate from and attaches to the body,
wherein at least a portion of the bottom portion is in communication with the body,
wherein at least a portion of the raised portion extends above a surface of the body,
wherein the operative end of the female connector is retained in the second open end of the raised portion to provide the female connector of the USB cable in a film and flat position with the operative end of the female connector being operable and above the surface of the body,
wherein an exit on the body is adjacent to the raised portion for the cable to go through, which connects the female connector in the sheath to the power storage space in the body,
wherein a mobile phone wireless charger connects to the operative end of the female connector.

2. A sheath as in claim 1, where the bottom portion of the sheath is in communication with the body by an attachment means, the attachment means may be selected from the group consisting of stitching, glue, rivet and screw.

3. A sheath as in claim 1, wherein the surface of the body is inside of a bag pocket.

* * * * *